*(12)* United States Patent
Enssle et al.

(10) Patent No.: US 10,535,198 B2
(45) Date of Patent: Jan. 14, 2020

(54) SYSTEMS AND METHODS FOR AN AUGMENTED DISPLAY SYSTEM

(71) Applicant: Walmart Apollo, LLC, Bentonville, AR (US)

(72) Inventors: Benjamin D. Enssle, Bella Vista, AR (US); David Blair Brightwell, Bentonville, AR (US); Cristy Crane Brooks, Cassville, MO (US); Greg A. Bryan, Bentonville, AR (US); Sonney George, Bentonville, AR (US); Barrett Freeman, Bentonville, AR (US); Sachin Padwal, Burlingame, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 28 days.

(21) Appl. No.: 16/003,867

(22) Filed: Jun. 8, 2018

(65) Prior Publication Data

US 2018/0357827 A1 Dec. 13, 2018

Related U.S. Application Data

(60) Provisional application No. 62/678,529, filed on May 31, 2018, provisional application No. 62/517,242, filed on Jun. 9, 2017.

(51) Int. Cl.
*G06F 3/147* (2006.01)
*G06F 3/033* (2013.01)
(Continued)

(52) U.S. Cl.
CPC ........ *G06T 19/006* (2013.01); *G06F 3/04883* (2013.01); *G06K 9/325* (2013.01);
(Continued)

(58) Field of Classification Search
CPC ......... G06T 19/20; G06T 19/00; G06Q 30/06; G06Q 10/087; G06F 3/033; G06F 3/02; G06F 3/147; G09G 5/08; G09G 5/00
See application file for complete search history.

(56) References Cited

U.S. PATENT DOCUMENTS 6,018,397 A 1/2000 Cloutier et al.
6,601,759 B2 8/2003 Fife et al.
(Continued)

OTHER PUBLICATIONS

International Search Report and Written Opinion from related International Patent Application No. PCT/US2018/036728 dated Sep. 6, 2018.
(Continued)

*Primary Examiner* — Pegeman Karimi
(74) *Attorney, Agent, or Firm* — McCarter & English, LLP; David R. Burns

(57) ABSTRACT

Described in detail herein are systems and methods for an augmented display system. A computing system can determine whether a physical object is absent from a designated location in a facility in response to data retrieved from the database. The computing system can insert a virtual element in a planogram corresponding to the designated location of the facility in response to determining the physical object is absent. The computing system can augment via interaction with the application executing on the portable electronic device.

31 Claims, 13 Drawing Sheets

(51) Int. Cl.
  *G06T 19/00* (2011.01)
  *G06K 9/32* (2006.01)
  *G06F 3/0488* (2013.01)
  *G06Q 10/08* (2012.01)
  *G06Q 30/02* (2012.01)
  *H04N 5/232* (2006.01)
  *G06T 11/00* (2006.01)
  *G06K 9/00* (2006.01)
  *G06F 3/0484* (2013.01)

(52) U.S. Cl.
  CPC ....... *G06Q 10/087* (2013.01); *G06Q 30/0202* (2013.01); *G06T 11/00* (2013.01); *H04N 5/232* (2013.01); *G06F 3/04842* (2013.01); *G06K 9/00671* (2013.01)

(56) References Cited

U.S. PATENT DOCUMENTS

| | | |
|---|---|---|
| 6,606,411 B1 | 8/2003 | Loui et al. |
| 6,745,186 B1 | 6/2004 | Testa et al. |
| 6,810,149 B1 | 10/2004 | Squilla et al. |
| 6,886,101 B2 | 4/2005 | Glazer et al. |
| 6,937,989 B2 | 8/2005 | McIntyre et al. |
| 7,177,820 B2 | 2/2007 | McIntyre et al. |
| 7,222,363 B2 | 5/2007 | Rice et al. |
| 7,431,208 B2 | 10/2008 | Feldman et al. |
| 7,587,756 B2 | 9/2009 | Peart et al. |
| 7,716,064 B2 | 5/2010 | McIntyre et al. |
| 8,069,092 B2 | 11/2011 | Bryant |
| 8,321,302 B2 | 11/2012 | Bauer et al. |
| 8,572,712 B2 | 10/2013 | Rice et al. |
| 8,814,039 B2 | 8/2014 | Bishop et al. |
| 8,820,633 B2 | 9/2014 | Bishop et al. |
| 8,851,369 B2 | 10/2014 | Bishop et al. |
| 8,972,291 B2 | 3/2015 | Rimnac et al. |
| 9,367,831 B1 | 6/2016 | Besehanic |
| 2002/0138336 A1 | 9/2002 | Bakes et al. |
| 2003/0126030 A1 | 7/2003 | Hungerford |
| 2009/0024450 A1 | 1/2009 | Chen et al. |
| 2009/0125411 A1 | 5/2009 | Otto et al. |
| 2013/0346160 A1 | 12/2013 | Dunst et al. |
| 2014/0129354 A1* | 5/2014 | Soon-Shiong ......... G06Q 30/06 705/16 |
| 2014/0143039 A1 | 5/2014 | Branton |
| 2014/0180785 A1 | 6/2014 | Argue et al. |
| 2015/0046299 A1 | 2/2015 | Yan |
| 2015/0088703 A1* | 3/2015 | Yan ........................ G06F 3/147 705/28 |
| 2016/0055432 A1* | 2/2016 | Chen .................. G06Q 30/0242 705/7.12 |
| 2016/0171429 A1* | 6/2016 | Schwartz ........... G06K 9/00201 382/103 |
| 2016/0350708 A1 | 12/2016 | Jones et al. |
| 2016/0350787 A1 | 12/2016 | Taylor et al. |
| 2017/0132842 A1* | 5/2017 | Morrison ............. G06T 19/006 |

OTHER PUBLICATIONS

[SHELFIE] I Rewards for what's [not] in-store, http://www.takeashelfie.com/, 2014.

* cited by examiner

SYSTEMS AND METHODS FOR AN AUGMENTED DISPLAY SYSTEM

CROSS-REFERENCE TO RELATED PATENT APPLICATION

This application claims priority to U.S. Provisional Application No. 62/517,242 filed on Jun. 9, 2017 and U.S. Provisional Application No. 62/678,529 filed on May 31, 2018. The contents of each application are hereby incorporated by reference in their entirety.

BACKGROUND

Tracking the amount of physical objects in a facility based on database records, without physical confirmation can be prone to errors.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the disclosure and, together with the description, help to explain embodiments of the present disclosure. In the figures.

DETAILED DESCRIPTION

Figure 1:
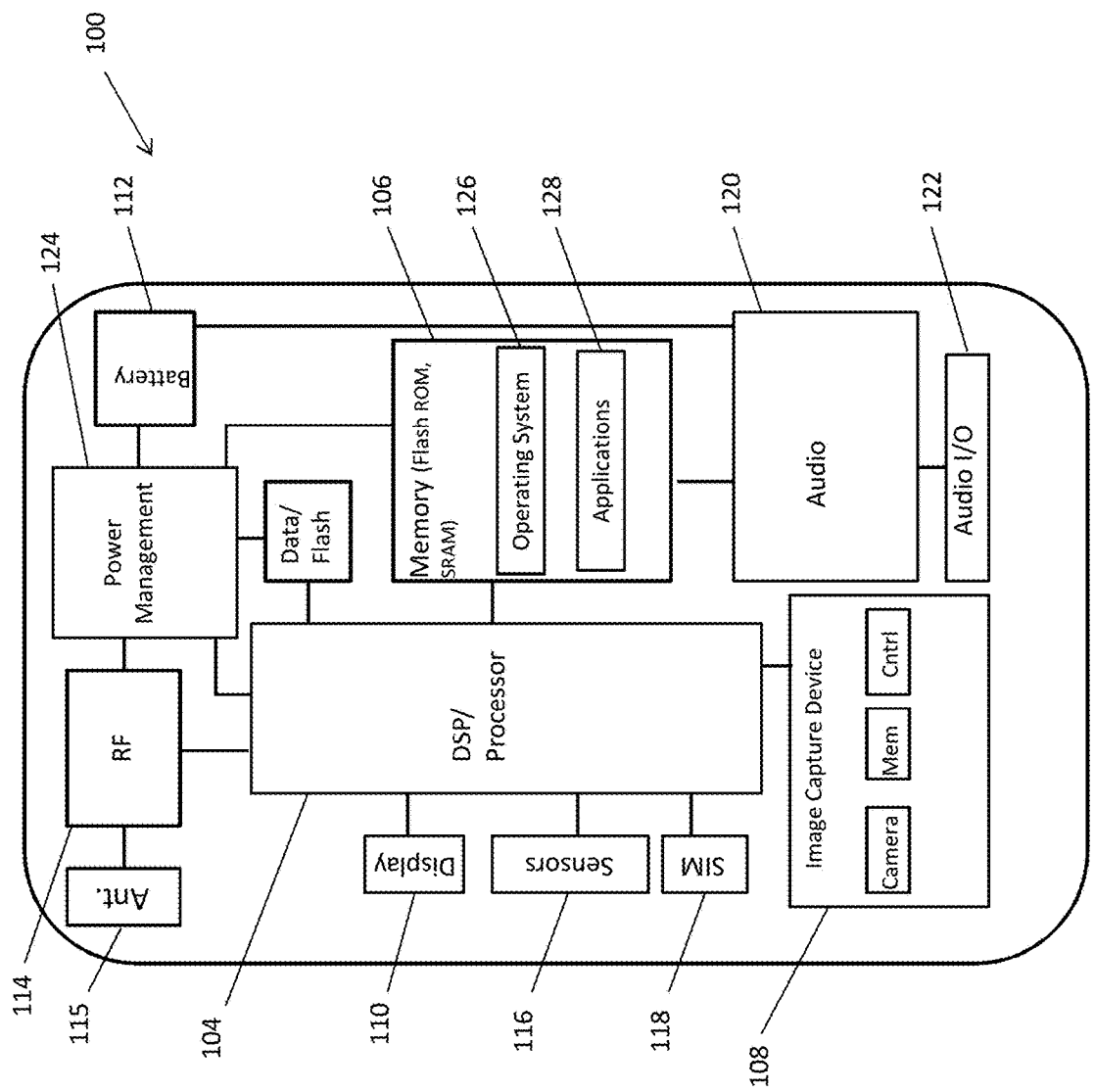
FIG. 1 illustrates a mobile device in accordance with an exemplary embodiment.

Described in detail herein are augmented display systems and methods. A user and/or customer in the retail store can interact with virtual elements disposed around out-of-stock/low-in-stock items to report the out-of-stock/low-in-stock items. The described system can calculate the loss of sales numbers accurately based on the received interactions. Additionally, the described system can calculate a forecast of sales and inventory more accurately based on the received interactions. The described system can provide an increased speed for detection of out-of-stock items. Additionally, the described system can estimate an amount of lost sales at location as a result of product outages. The system can also include a reward program and algorithms to encourage customers, who have an intention to purchase out-of-stock products, to report outages. The sales history of the customers who report the outages can be updated and used in forecasting algorithms.

In an exemplary embodiment, one or more servers can determine whether data retrieved from a database indicates that physical objects are absent from a designated location in a facility. In response to determining the absence of physical objects, the one or more servers can insert virtual elements in a planogram at locations corresponding to the designated physical locations in the facility. The one or more servers can establish sessions with portable electronic devices in response to a request received from an application executing on the portable electronic and a determination that the portable electronic devices are in the facility.

The one or more servers can receive discrete objects/elements in a physical scene from the portable electronic device, where the physical scene corresponds to a field of view of an image capturing device of the portable electronic device. The discrete objects/elements can be parsed to extract the virtual elements from the scene. In some embodiments, the virtual elements can correspond to labels.

Upon extracting the discrete virtual elements from the scene, the one or more servers can extract strings of alphanumeric characters from the discrete elements. The one or more servers can determine whether the strings correspond to the physical objects identified as being absent by the one or more servers based on the data retrieved from the database, and can augment, via interaction with the application executing on the portable electronic device, the scene as it is rendered on a touch-sensitive display of the portable device to superimpose or insert the virtual elements into the scene over and/or adjacent to the discrete elements extracted from the scene. The one or more servers can update the database based on user gestures interacting with the virtual elements rendered on the touch-sensitive display in the physical scene.

In an embodiment, the portable electronic device can execute an application stored in memory via the processor. The application is associated with a user of the portable electronic device. The portable electronic device can control the operation of the image capturing device, in response to executing the application to contemporaneously and continuously image an area within a field of view of the image capturing device. The portable electronic device can further render the physical scene within the field of view of the image capturing device on the touch-sensitive display. The portable electronic device can parse the physical scene rendered on the touch-sensitive display into the discrete objects/elements based on dimensions of items in the physical scene (e.g., pixel width and pixel height). The portable electronic device can render the virtual element associated with the physical objects on the touch touch-sensitive display. The portable electronic device can receive user gestures associated with the virtual elements, via the touch sensitive display, and can transmit, via the portable electronic device, the user gestures to the one or more servers.

The one or more servers can determine the physical objects are absent from the designated locations based on quantities of each set of like physical objects stored in the database, being less than a specified amount. The one or more servers can trigger an alert in response to updating the database based on the interaction between user gestures and the virtual elements included in the physical scene on the touch-sensitive display. The one or more servers can update the database to indicate the user of the portable device performed the user gesture confirming the physical objects are absent from the designated location, generate a score associated with the user of the portable electronic device, and transmit the score to the portable electronic device. The portable electronic device can render instructions on the touch-sensitive display instructing the user of the portable electronic device to navigate to a location in the facility associated with additional physical objects. The virtual elements can be image including selectable links. The selectable links can include information associated the physical objects. The one or more servers can receive a captured image of the physical scene in response to the user gesture(s) on the touch-sensitive screen.

In an embodiment, an augmented display system can include one or more data storage devices configured to store data associated with physical objects distributed in a facility and associated with locations at which the physical objects are distributed. The augmented display system can further include one or more servers coupled to the one or more data storage devices. The one or more servers are configured to determine a quantity of a set of physical objects is lower than a threshold amount at a designated location in a facility in response to retrieving the data from the one or more data storage devices, insert one or more virtual elements in a planogram corresponding to the designated location of the facility in response to determining the quantity of the set of physical objects is lower than the threshold amount. At least one of the virtual elements includes an identifier associated with the set of physical objects. The one or more servers is further configured to establish a session with a portable electronic device in response to a request received from an application executing on the portable electronic and a determination that the portable electronic device is in the facility and receive a first user gesture from the portable electronic device, associated a physical scene corresponding to a field of view of an image capturing device of the portable electronic device. The one or more servers are further configured to augment, via interaction with the application executing on the portable electronic device, the physical scene rendered on a touch-sensitive display of the portable device to insert the one or more virtual elements associated with the designated location of the physical object in the planogram into the scene, animate the at least one virtual element of the one or more virtual elements including the identifier of the set of physical objects in response to interaction with the one or more virtual elements via a second user gesture, extract the identifier from the at least one virtual element of the one or more virtual elements in response to receiving a third user gesture associated with the identifier of the set of physical objects via the portable electronic device, and derive new data for the set of physical objects in response to extracting the identifier based on the third gesture.

In one embodiment, the portable electronic device is configured to execute an application stored in memory via the processor, control the operation of the image capturing device, in response to executing the application to contemporaneously and continuously image an area within a field of view of the image capturing device, and render on the touch-sensitive display the physical scene within the field of view of the image capturing device. The portable electronic device is further configured to parse the physical scene rendered on the touch-sensitive display into the discrete elements based on dimensions of items in the physical scene, render the one or more virtual elements associated with the set of physical objects on the touch touch-sensitive display, receive the first, second and third user gesture associated with the one or more virtual elements, via the touch sensitive display, and transmit the first, second, and third user gestures to the one or more servers. The one or more virtual elements are graphical representations of a plurality of cards disposed inside an envelope, each card including the identifier associated with the set of physical objects.

In one embodiment, the one or more servers are configured to receive a captured image of the physical scene in response to one or more of the first, second or third user gesture on the touch-sensitive screen. The one or more servers are configured to confirm the quantity of the set of physical objects is below the threshold amount based on the captured image, trigger an alert in response to confirming the quantity of the set of physical objects is below the threshold amount, and update a database with the new data to indicate a user of the portable electronic device correctly reported that the quantity of the set of physical objects is below the threshold amount, using the portable electronic device. The one or more servers are configured to determine a location of the portable electronic device is within a threshold distance of the designated location of a set of physical objects, in response to receiving the first user gesture from the portable electronic device.

In one embodiment, sensors in communication with the one or more servers are disposed on the shelving units. The plurality of sensors are configured to detect one or more attributes associated with the set of physical objects, encode the one or more attributes associated with the set of physical objects in one or more electrical signals, and transmit the electrical signals to the one or more servers. The one or more servers are configured to receive the electrical signals from the plurality of sensors, extract the one or more attributes associated with the set of physical objects from the electrical signals, and determine the quantity of the set of physical objects is below a threshold amount based on the one or more attributes.

FIG. 1 is a block diagram of a portable electronic device 100 that can be utilized to implement and/or interact with embodiments of an augmented display system. The portable electronic device can be a mobile device. For example, the portable electronic device 100 can be a smartphone, tablet, subnotebook, laptop, personal digital assistant (PDA), and/or any other suitable mobile device that can be programmed and/or configured to implement and/or interact with embodiments of the augmented display system. The portable electronic device 100 can include a processing device 104, such as a digital signal processor (DSP) or microprocessor, memory/storage 106 in the form a non-transitory computer-readable medium, an image capture device 108, a touch-sensitive display 110, a battery 112, and a radio frequency transceiver 114. Some embodiments of the portable electronic device 100 can also include other common components commonly, such as sensors 116, subscriber identity module (SIM) card 118, audio input/output components 120 and 122 (including e.g., one or more microphones and one or more speakers), and power management circuitry 124.

Figure 4:
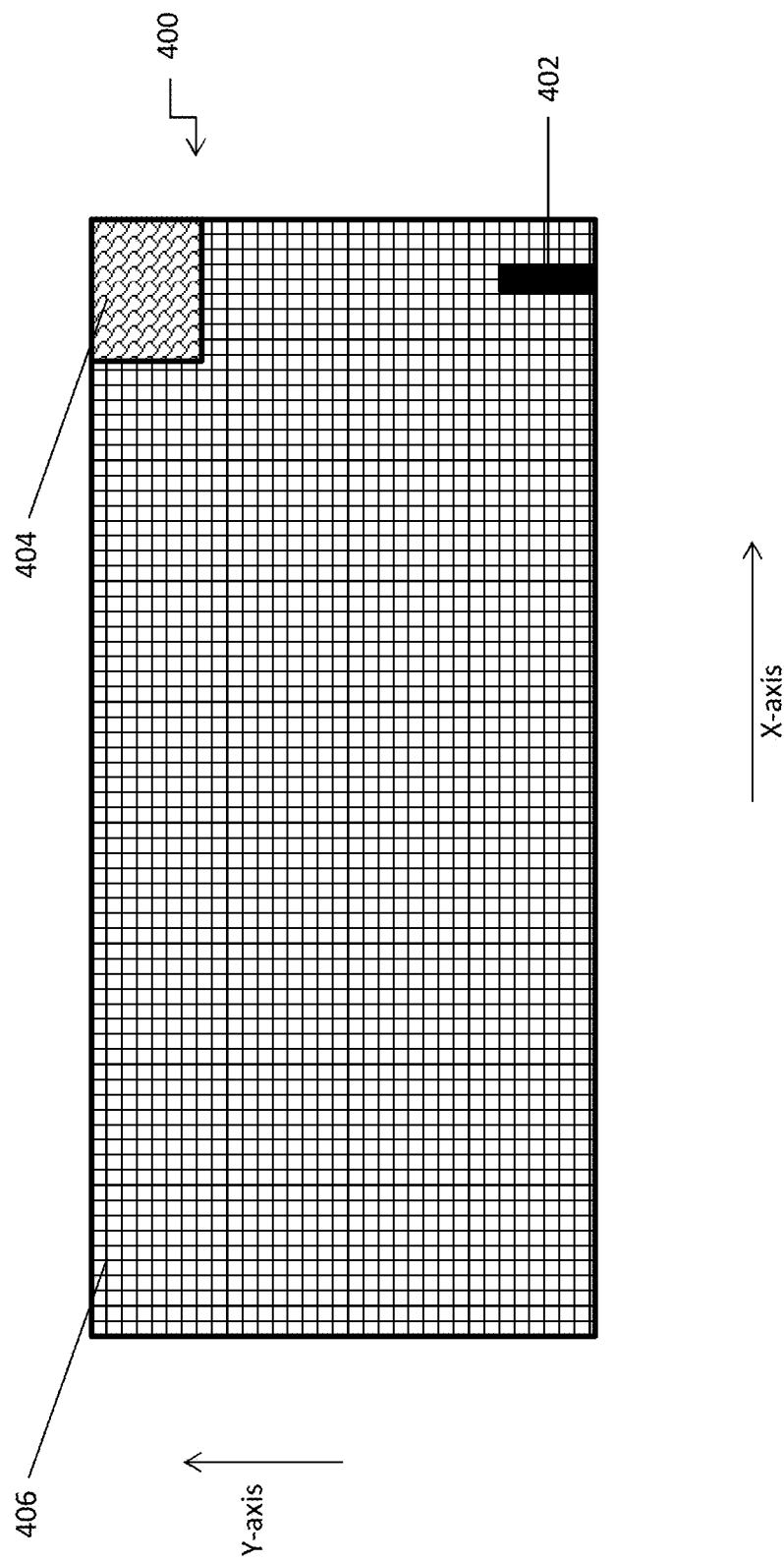
FIG. 4 illustrates an array of sensors according to an exemplary embodiment.

The memory 106 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, an operating system 126 and applications 128 can be embodied as computer-readable/executable program code stored on the non-transitory computer-readable memory 106 and implemented using any suitable, high or low level computing language and/or platform, such as, e.g., Java, C, C++, C#, assembly code, machine readable language, and the like. In some embodiments, the applications 128 can include an assistance application configured to interact with the microphone, a web browser application, a mobile application specifically coded to interface with one or more servers. One or more servers are described in further detail with respect to FIG. 4. While memory is depicted as a single component those skilled in the art will recognize that the memory can be formed from multiple components and that separate non-volatile and volatile memory devices can be used.

The processing device 104 can include any suitable single- or multiple-core microprocessor of any suitable architecture that is capable of implementing and/or facilitating an operation of the portable electronic device 100. For example, to perform an image capture operation, capture a voice input of the user (e.g., via the microphone), transmit messages including a captured image and/or a voice input and receive messages from a computing system, display data/information including GUIs of the user interface 110, captured images, voice input transcribed as text, and the like. The processing device 104 can be programmed and/or configured to execute the operating system 126 and applications 128 to implement one or more processes to perform an operation. The processing device 104 can retrieve information/data from and store information/data to the storage device 106.

The RF transceiver 114 can be configured to transmit and/or receive wireless transmissions via an antenna 115. For example, the RF transceiver 114 can be configured to transmit data/information, such as input based on user interaction with the mobile device. The RF transceiver 114 can be configured to transmit and/or receive data/information having at a specified frequency and/or according to a specified sequence and/or packet arrangement.

The touch-sensitive display 110 can render user interfaces, such as graphical user interfaces to a user and in some embodiments can provide a mechanism that allows the user to interact with the GUIs. For example, a user may interact with the portable electronic device 100 through touch-sensitive display 110, which may be implemented as a liquid crystal touch-screen (or haptic) display, a light emitting diode touch-screen display, and/or any other suitable display device, which may display one or more user interfaces (e.g., GUIs) that may be provided in accordance with exemplary embodiments.

The power source 112 can be implemented as a battery or capacitive elements configured to store an electric charge and power the portable electronic device 100. In exemplary embodiments, the power source 112 can be a rechargeable power source, such as a battery or one or more capacitive elements configured to be recharged via a connection to an external power supply.

A user can operate the portable electronic device 100 in a facility, and the graphical user interface can automatically be generated in response executing a generation application on the portable electronic device 100. The generation application can be associated with the facility. The image capturing device 108 can be configured to capture still and moving images and can communicate with the executed application.

The user can view a planogram of the facility using the graphical user interface generated by the portable electronic device 100. Furthermore, in response to interacting with the touch-sensitive display 110 while the generation application is being executed, the touch-sensitive display 110 can render the area of the facility viewable to the image capturing device 110. The user can interact with the planogram and/or the area of the facility viewable to the image capturing device, using the touch-sensitive display 110. The portable electronic device 100 can transmit input based on the user's interaction with the display.

Figure 2A:
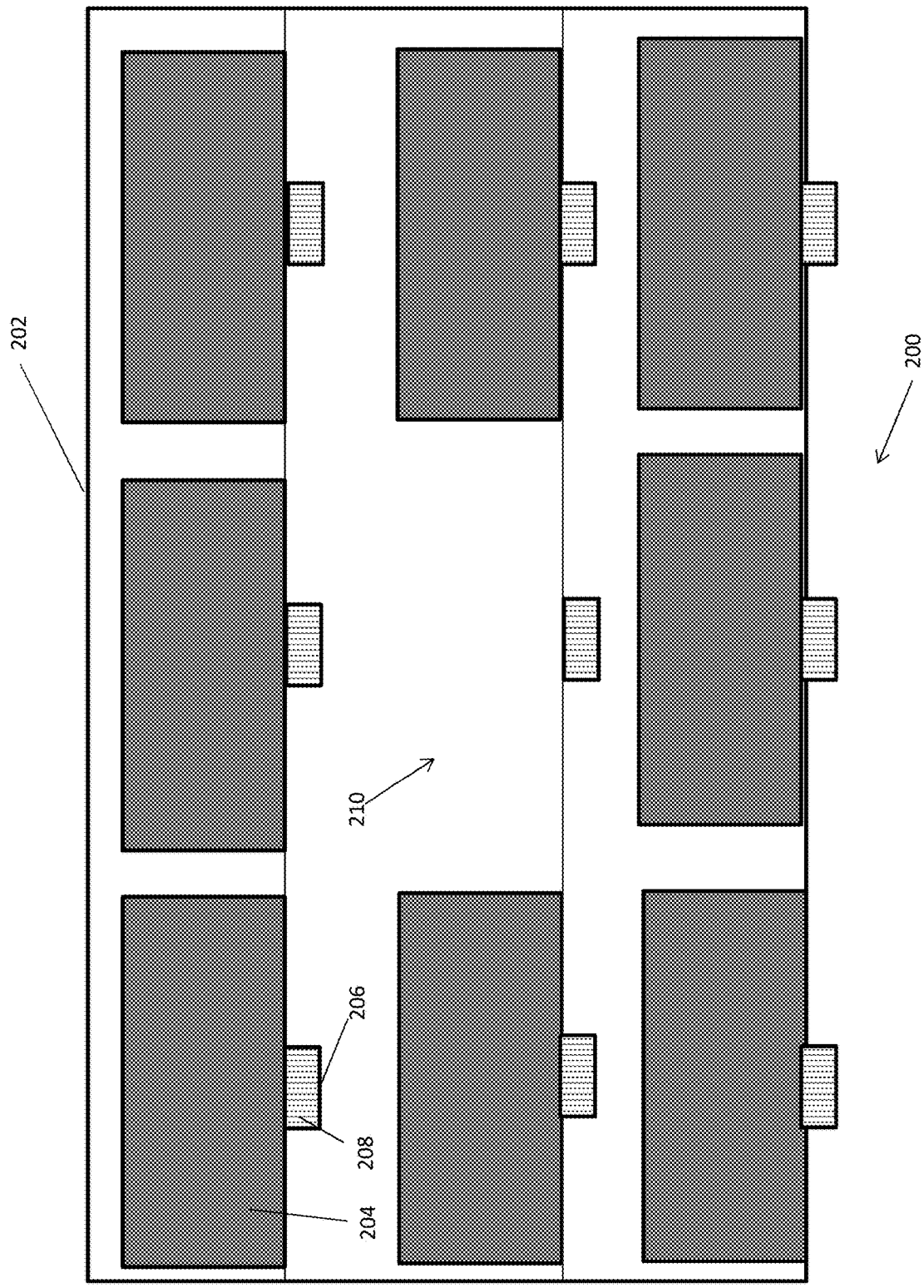
FIG. 2A is a schematic diagram of an exemplary arrangement of physical objects disposed in a facility according to an exemplary embodiment.

FIG. 2A is a schematic diagram of an exemplary arrangement of physical objects disposed in a facility according to an exemplary embodiment. A shelving unit 202 can be disposed in a facility 200. The shelving unit 202 can support and hold physical objects 204. The physical objects 204 can be disposed on shelves of the shelving unit 202 such that sets of like physical objects 204 are grouped together. Labels 206 can be disposed beneath each set of like physical objects 204 and can include a string of alphanumeric characters and/or a machine-readable element 208 encoded with an identifier associated with a set of like physical objects disposed above (or below) the corresponding label 206. A set of like physical objects 204 can also be absent from the shelving unit 202 creating a vacant space 210.

Figure 2B:
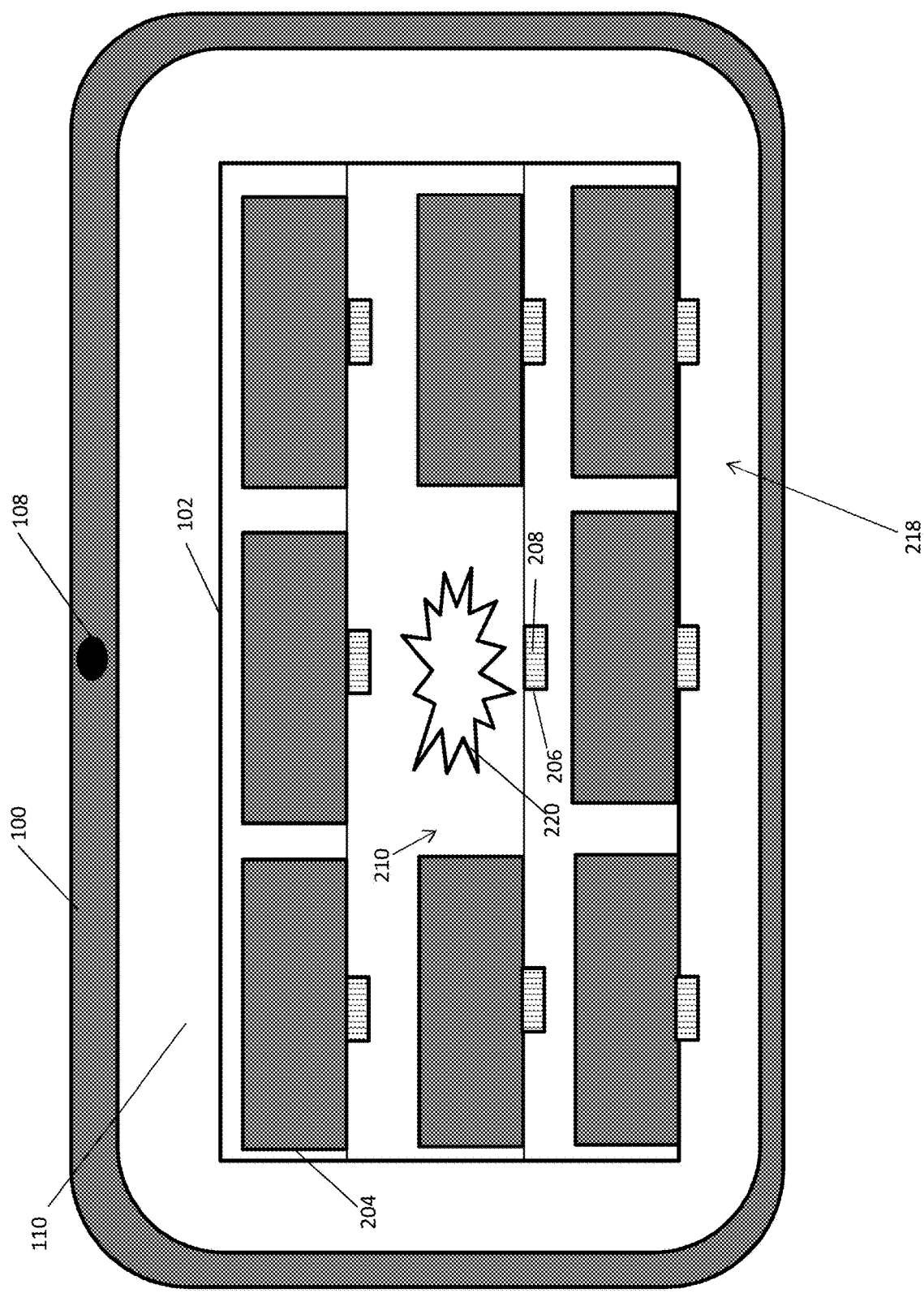
FIG. 2B is a schematic diagram of an image capturing device capturing the arrangement of physical objects disposed in a facility according to an exemplary embodiment.

FIG. 2B is a schematic diagram of an image capturing device 108 of a portable electronic device 100 capturing a physical scene including an arrangement of physical objects disposed in a facility according to an exemplary embodiment. The portable electronic device 100 can also include a touch-sensitive display 110. The image capturing device 108 can capture still or moving images. The image capturing device 108 can be disposed on the front or rear of the portable electronic device 200. The touch-sensitive display 110 can display the physical scene in the field of view of the image capturing device 108 as it is being captured.

In exemplary embodiment, the portable electronic device 100 can execute the generation application to instruct the portable electronic device 100 to power on the image capturing device 108 and control the operation of the image capturing device 108. An exemplary embodiment of the generation application is described herein with reference to FIG. 4. In response to powering on, a lens and optical sensor of the image capturing device 108 can become operational. The image capturing device 108 can be pointed at a physical scene; viewable to the lens and optical sensor, and the physical scene being captured by the optical sensor can be rendered on the touch-sensitive display 110. The image capturing device 108 can zoom, pan, capture and store the physical scene. For example, the physical scene can include the shelving unit 202 disposed in the facility 200 as illustrated in FIG. 2.

In one embodiment, in response to pointing the image capturing device 108 at a physical scene 218 for more than a specified amount of time (e.g., an amount of time the image capturing device captures the same scene—with minor variations/movement—exceeds a specified threshold), the image capturing device 108 can detect attributes associated with the physical scene 218. For example, the physical scene 218 can include the shelving unit 202, the image capturing device 108 can detect attributes (e.g. shapes, sizes, dimensions etc . . . ) of a physical item in the physical space, such as the shelving unit 202, various physical objects 204 disposed on the shelving unit 202 and the corresponding labels 206. In some embodiments, the touch-sensitive display 110 can display a visual indicator each time a physical item (i.e. the shelving unit 202, physical objects 204 and/or labels 206) is detected. For example, the visual indicator can be a box superimposed around the physical item. The portable electronic device 100 can correlate the detected physical objects 204 with the labels 206 disposed beneath the physical objects 204. The portable electronic device 100 can also determine there is a vacant space 210 above a label 206.

In a non-limiting example operation, a user operating the portable electronic device 200 can tap or touch a physical item displayed on the touch-sensitive display 202. The portable electronic device 200 can receive a virtual element 220. The portable electronic device 200 can augment the display of the physical scene on the touch-sensitive display 202, by superimposing or overlaying the virtual element 220 in the location of the vacant space 210 on the physical scene rendered on the touch-sensitive display 110. It can be appreciated, that the virtual element 220 can be any shape or size. The virtual element 220 can also be animated.

The user can touch or tap the touch-sensitive display 202, on or around the screen area on which the virtual element 220 is displayed, to interact with the virtual element 220. The image capturing device 108 can extract a string of characters or decode a identifier from the machine-readable element 208 displayed on the label 206 corresponding to the physical object designated to be disposed in the vacant space 210. In response to interacting with the virtual element 220, the portable electronic device 200 can send the extracted string or decoded identifier to the one or more servers. Furthermore, in response to interacting with the virtual element 220, the portable electronic device 200 can operate the image capturing device to capture an image of the viewable area, including the vacant space 210. The portable electronic device 200 can transmit the image to the one or more servers.

In some embodiments, the portable electronic device 200 will determine the coordinates along the X and Y axis on the display screen, of the location of the viewable area of the vacant space 210. The portable electronic device 200 will overlay the virtual element 220 with respect to the determined location of the vacant space 210. The portable electronic device 200 can determine the location of the virtual element 220 displayed on the screen. The portable electronic device 200 can receive input from the user associated with the virtual element 220, determining the user has touched or tapped the touch-sensitive display on a location corresponding to the virtual element 220.

In another non-limiting example operation, after the portable electronic device 200 identifies the labels in the physical scene, the portable electronic device 200 can extract strings from the labels, superimpose or overlay visual indicators on the labels, and embed a link in the visual indicators. In some embodiments, the portable electronic device determines which of the labels corresponds to a vacant space and embeds a selectable link in the visual indicator associated with the label. In response to selection of the visual indicator, e.g., based on a user gesture on the touch-sensitive display, the portable electronic device transmits the string extracted from the visual indicator to a server, which can retrieve data associated with the physical object designated to be disposed in the vacant space. The server can transmit instructions including the data to the portable electronic device which can augment the physical scene to superimpose or overlay the virtual element and/or the data associated with the physical object in the vacant space and to superimpose or overlay user interface objects relative to the data. The user, via user gestures, can interact with the user interface objects to modify the database from which the data was retrieved to update the data.

Figure 2C:
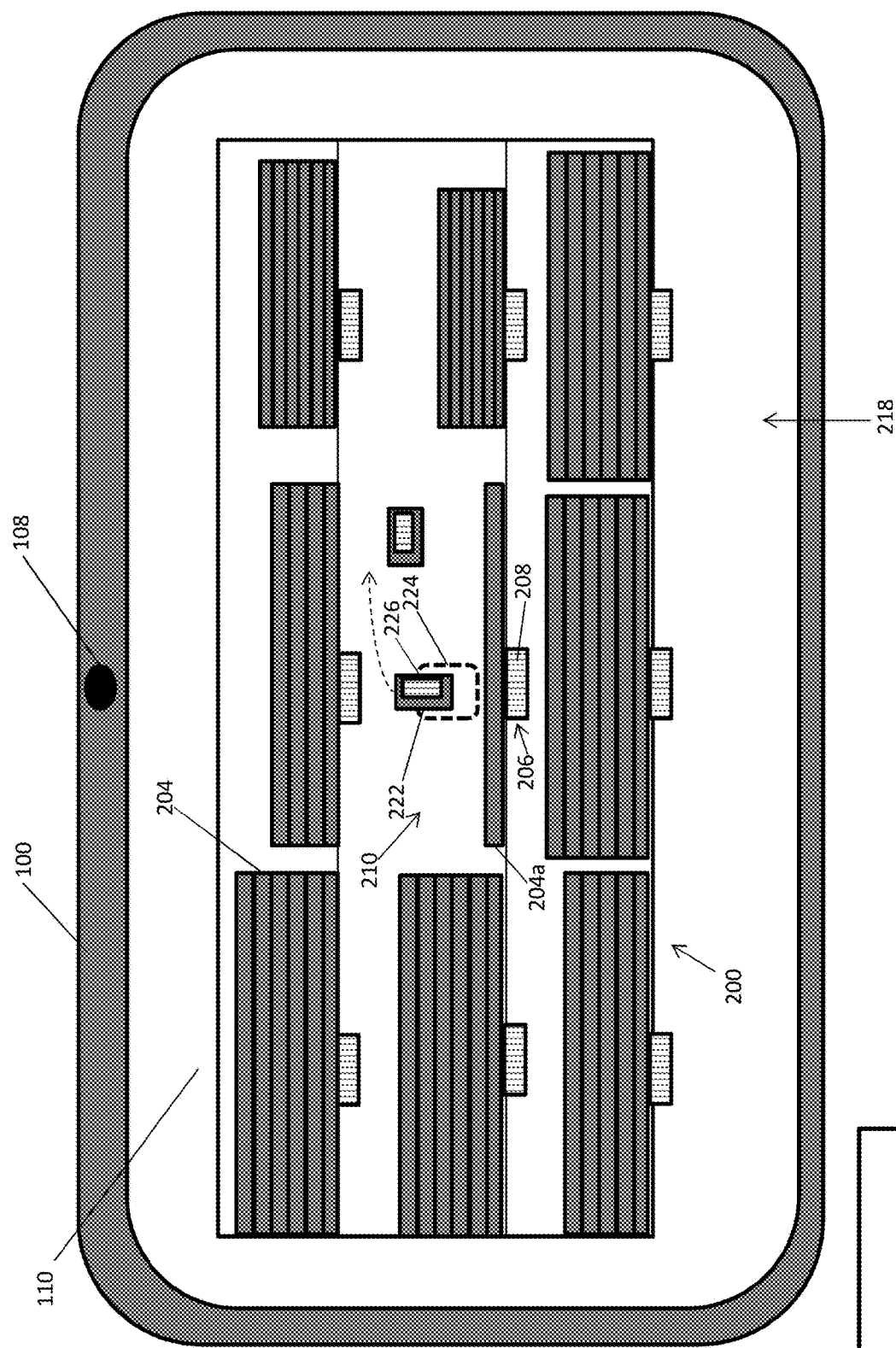
FIG. 2C is a schematic diagram of an image capturing device capturing the arrangement of physical objects disposed in a facility according to an exemplary embodiment.

FIG. 2C is a schematic diagram of an image capturing device 108 of a portable electronic device 100 capturing a physical scene including an arrangement of physical objects disposed in a facility according to an exemplary embodiment. The portable electronic device 100 can correlate the detected physical objects 204 with the labels 206 disposed beneath the physical objects 204. In a non-limiting example operation, a user can point the image capturing device 108 toward a shelving unit which includes quantity of a particular set of like physical objects lower than a threshold amount designate to be disposed at a location 210 on the shelving unit 202. The portable electronic device 200 can receive a virtual element. The virtual element can be a graphical representation of an envelope 222 and cards 224 disposed inside the envelope. The portable electronic device 200 can augment the display of the physical scene 218 on the touch-sensitive display 110, by superimposing or overlaying the graphical representations of the envelope 222 and cards 224, in the location 210 on the shelving unit 202, on the physical scene 218, rendered on the touch-sensitive display 110. It can be appreciated that the graphical representations of the envelope 222 and cards 224 can be any shape or size. The cards 224 can include including labels 226 with strings and/or machine-readable elements encoded with identifiers associated with the physical objects designated to be disposed at the location 210.

The user can touch or tap the touch-sensitive display 110, on or around the screen area on which the graphical representations of the envelope 222 and cards 224 are displayed, to interact with the graphical representations of the envelope 222 and cards 224. An animation of a card 224 can be rendered on touch-sensitive display 110, For example, the cards 224 can be vertically disposed in the envelope 222. In response to touching or tapping on or around the screen area on which the graphical representations of the envelope 222 and cards 224, the touch sensitive display 110 can animate the card 224 coming out of the envelope and aligning itself perpendicularly and adjacent to the envelope 222. The image capturing device 108 can extract a string of characters or decode a identifier from the machine-readable element on the label 226 displayed on the card 224 which corresponds to the physical object designated to be disposed in the location 210. In response to interacting with the graphical representations of the envelope 222 and cards 224, the portable electronic device 200 can send the extracted string or decoded identifier to the one or more servers/computing systems. Furthermore, in response to interacting with the graphical representations of the envelope 222 and cards 224, the portable electronic device 200 can operate the image capturing device 108 to capture an image of the viewable area, including the location 210. The portable electronic device 200 can transmit the image to the one or more servers/computing systems.

In some embodiments, the portable electronic device 200 will determine the coordinates along the X and Y axis on the display screen, of the location 210 in the viewable area. The portable electronic device 200 will overlay the graphical representations of the envelope 222 and cards 224 with respect to the determined location of the location 210. As an example, the graphical representations of the envelope 222 and cards 224 can be displayed in an area in the viewable area, without overlapping any physical objects 204 within the viewable area. The portable electronic device 200 can determine the location of the graphical representations of the envelope 222 and cards 224 displayed on the screen. The portable electronic device 200 can receive input from the user associated with the graphical representations of the envelope 222 and cards 224, determining the user has touched or tapped the touch-sensitive display on a location corresponding to the graphical representations of the envelope 222 and cards 224.

In another non-limiting example operation, after the portable electronic device 200 identifies the labels in the physical scene, the portable electronic device 200 can extract strings from the labels 226 displayed on the cards 224, superimpose or overlay visual indicators on the labels 226, and embed a link in the machine readable elements on the labels 226. In response to selection of the visual indicator, e.g., based on a user gesture on the touch-sensitive display, the portable electronic device transmits the string extracted from the visual indicator to a server/computing system, which can retrieve data associated with the physical object designated to be disposed in the location 210. The server/computing system can transmit instructions including the data to the portable electronic device 200 which can augment the physical scene to superimpose or overlay the graphical representations of the envelope 222 and cards 224 and/or the data associated with the physical object in the vacant space and to superimpose or overlay user interface objects relative to the data. The user, via user gestures, can interact with the user interface objects to modify the database from which the data was retrieved to update the data.

In one embodiment, the image capturing device 108 of the portable electronic device 200 can capture an image of the card 224 disposed adjacent to the envelope 222. A user can navigate to a Point of Sale (POS) terminal 250. The POS terminal 250 can include an optical scanner 260 configured to scan and decode machine readable elements such as barcodes and/or QR codes. The portable electronic device 200 can render the image of the card 224 including the label 226. The optical scanner 260 can scan and decode an identifier of the set of physical objects on the machine readable element displayed on the label 226 of the card 224.

Figure 3:
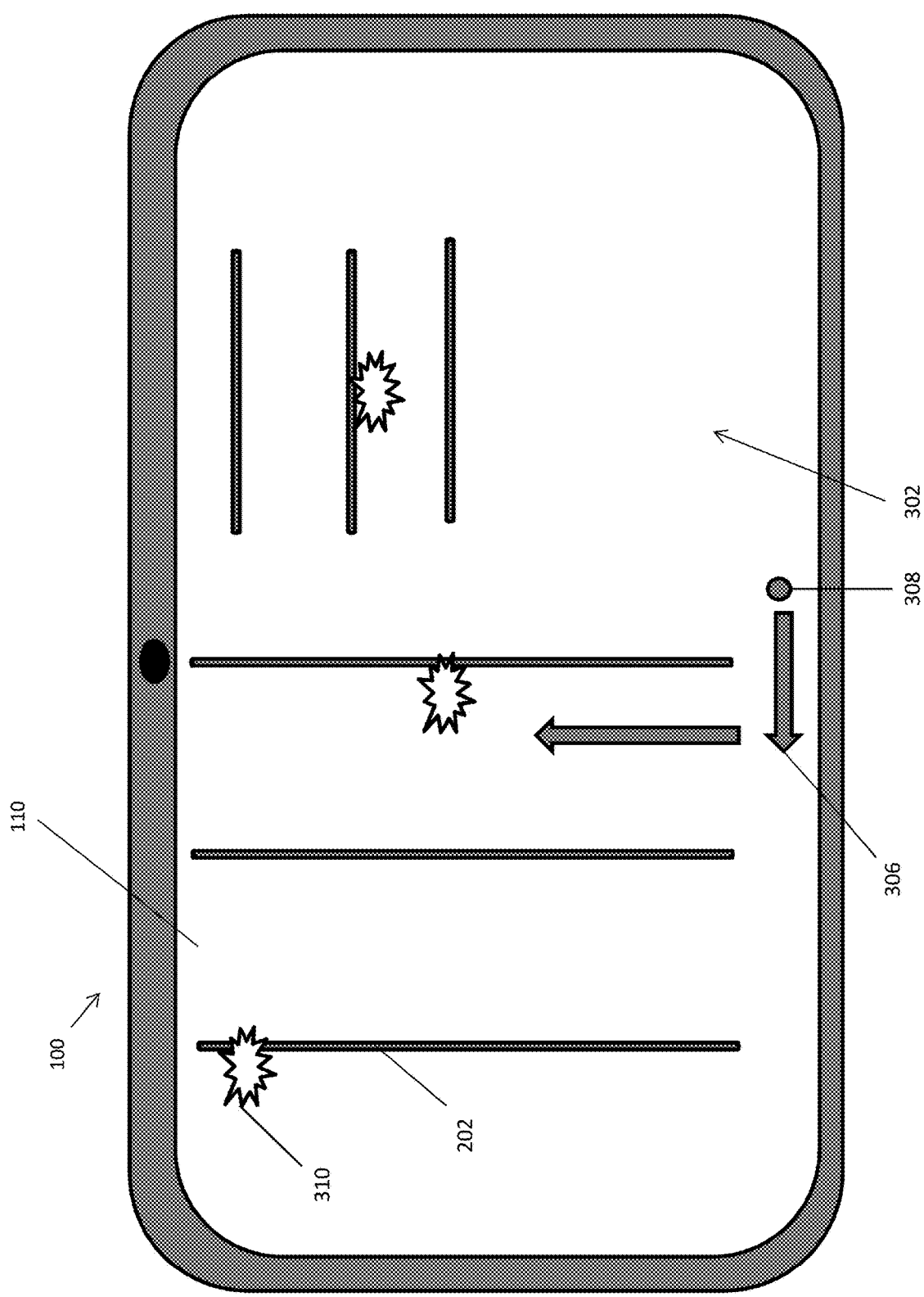
FIG. 3 is a block diagram of a mobile device displaying a facility planogram.

FIG. 3 is a block diagram of a mobile device displaying a facility planogram. As mentioned above, the portable electronic device 200 can execute a generation application. The generation application can receive a planogram 302 of the facility in which the portable electronic device 200 is located. The generation application can display the planogram 302 on the touch-sensitive display 110 of the portable electronic device 200. The planogram can indicate shelving units 202 disposed around the facility and the virtual elements 310 (i.e., virtual elements 220 as shown in FIG. 2B and virtual elements 222-226 as shown in FIG. 2C) associated with specific locations of the shelving units 202. The generation application can also generate a location indicator 308, indicating the location of the portable electronic device 200 with respect to the planogram 302. Furthermore, the generation application can also generate and display directional arrows 306, guiding the user of the portable electronic device 200 to the virtual elements 310.

Figure 5:
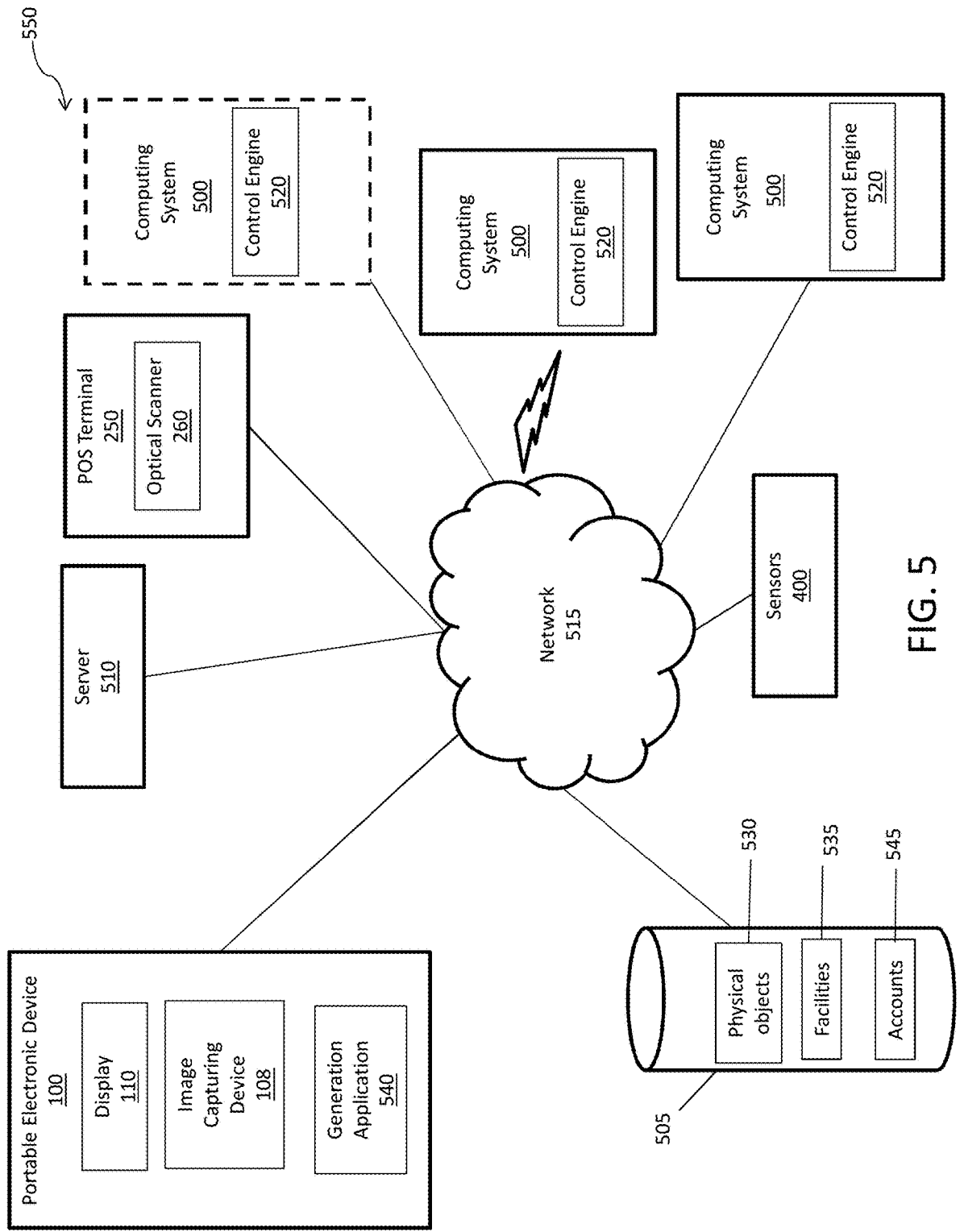
FIG. 5 illustrates a network diagram of an augmented touch-sensitive display system in accordance with an exemplary embodiment.

FIG. 5 illustrates a network diagram in which an augmented display system can be implemented in accordance with an exemplary embodiment. The augmented display system 550 can include one or more databases 505, one or more computing systems 500, one or more portable electronic devices 100, and one or more POS terminals 250 communicating over communication network 515. The portable electronic device 100 can include a touch-sensitive display 110, an image capturing device 108, and a generation application 540. The generation application 540 can be an executable application residing on the portable electronic device 100, as described herein. The computing system 500 can execute one or more instances of a control engine 520. The control engine 520 can be an executable application residing on the computing system 500 to implement the augmented display system 550 as described herein. The computing system 500 can be embodied as one or more servers.

In an example embodiment, one or more portions of the communications network 515 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 500 includes one or more computers or processors configured to communicate with the databases 505, POS terminals 250, and portable electronic devices 100 via the network 515. The computing system 500 hosts one or more applications configured to interact with one or more components of the augmented display system 550. The databases 505 may store information/data, as described herein. For example, the databases 505 can include a physical objects database 530, a facilities database 535 and an accounts database 545. The physical objects database 530 can store information associated with physical objects. The facilities database 535 can store information associated with facilities. The information can include a layout of a facility, a planogram of a facility, a blueprint of a facility, the structure of a facility and/or any other information related to a facility. The accounts database 545 can include information about accounts associated with the generation application 540. The databases 505 can be located at one or more geographically distributed locations from the first computing system 500. Alternatively, the databases 505 can be included within the computing system 500.

In one embodiment, the computing system 500 can execute a control engine 520. The control engine can query the physical objects database 530 to determine whether physical objects are absent in any facility. In response to determining, a physical object is absent from a facility, the control engine 520 can retrieve a planogram of the facility. The control engine 520 can determine the designated location of the physical object which is found to be absent, within the facility, with respect to the planogram. The control engine 520 can insert a virtual element on the designated location a user can operate a portable electronic device 100 in a facility.

A user can operate the portable electronic device 100 in the facility. The portable electronic device 100 can execute a generation application 540 in response to the user's interaction. The generation application 540 can establish a session with the computing system 500. For example, generation application 540 can transmit identification information of the portable electronic device 100. The control engine 520 can access a location services module of the portable device in response to initiating the session. The location service module can determine the location of the mobile device (i.e. GPS coordinates). The control engine 520 can determine the location of the portable electronic device 100 and can determine the portable electronic device 100 is within the facility. The control engine 520 can transmit the planogram of the facility to the portable electronic device. The planogram can include the virtual elements in the designated location of the absent physical object. The planogram (e.g. as shown in FIG. 3) can be displayed on the touch-sensitive display 110 of the portable electronic device 100. In some embodiments, the user can touch, or tap the virtual elements on the planogram and in response to touching or tapping the virtual element; information about physical object absent from the particular location can be displayed on the touch-sensitive display 110 of the portable electronic device 100. The information can include the name, type, color, size and other information about the physical object.

The user can navigate to the location in the facility at which a virtual element is disposed on the planogram. The generation application 540 control the operation of the image capturing device 108, to power on the image capturing device 108. In response to powering on, a lens and optical sensor included in the image capturing device 108 can become operational. The image capturing device 108 can be pointed at a physical scene in the facility, viewable to the lens and optical sensor, and the physical scene can displayed on the touch-sensitive display 110. The image capturing device 108 can zoom, pan, capture and store the physical scene. For example, the physical scene can be the shelving unit disposed in the facility. The user can point the image capturing device at the designated location of absent physical objects. The designated location in the physical scene can be viewable on the touch-sensitive display 110.

In one embodiment, in response to pointing the image capturing device 108 at a physical scene (e.g. the shelving unit) for more than a specified amount of time, the image capturing device 108 can detect attributes associated with the physical scene. Continuing with the example in which the physical scene includes the shelving unit, the image capturing device 108 can detect attributes (e.g. shapes, sizes, dimensions etc . . . ) of a physical item in the physical space, such as the shelving unit, various physical objects disposed on the shelving unit and labels corresponding to the physical objects. The image capturing device 108 can detect attributes associated with the physical items in the physical based on small details such as the size of the pixels, the color of the pixels and the quantity of the pixels of an object as distinctive features, where the distinctive features are extracted into an object model to recognize the object, and/or can detect attributes associated with the physical items in the physical scene based on detected edges (i.e. based on a change of color in neighboring pixels) of the different shapes of the physical items in the physical scene. The shape, dimensions, and size of the physical items can be determined based on the detection of the edges.

The user operating the portable electronic device 100 can tap or touch a physical item displayed on the touch-sensitive display 108. The physical item can be an area of the shelving unit in which the physical object is designated to be disposed. The portable electronic device 200 can detect the label associated with designated location of the physical object. As described herein, the label can include a machine readable element and/or a string of alphanumeric text. The portable electronic device 100 can receive a user gesture, such as a tap or a touch on a location on the screen, and/or a non-touch user gesture. The generation application 540 can generate a selectable link and superimpose the selectable link over the label. The portable electronic device 100 can receive another user gesture selecting the selectable link. The portable electronic device 100 can transmit the decoded identifier form the machine-readable element and/or the alphanumeric text to the computing system 500, in response to selecting the link. In some embodiments, in response to selecting the link the image capturing device can capture an image of the physical scene and the portable electronic device 100 can transmit the image to the computing system 500. Alternatively, or in addition, the portable electronic device 100 can transmit the detected attributes of the physical object or space on which the user as tapped or touched, to the computing system 500. The attributes can include shape, size, and dimensions associated with the area of the designated location of the physical object.

The control engine 520 can identify the physical object based on the identifier and/or alphanumeric text associated with the physical object. The control engine 520 can conduct image analysis on the received image of the physical scene including the area of the designated location of the physical object. The control engine 520 can also determine the location of the portable electronic device by accessing the location services module of the portable electronic device 100. The control engine 520 can confirm the physical object is absent from the designated location based on determining the vacant space in the area of the designated location of the physical object using the image analysis and by matching the location of the portable electronic device with the designated location of the absent physical object. The control engine 520 can transmit/trigger an alert based on confirming the physical object is absent. Alternatively, the control engine 520 can determine the physical object is present at the designated location based on the image analysis. In some embodiments, the control engine 520 can identify the physical object based on received attributes associated with the physical object and/or space in which the physical object is designated to be disposed. The control engine 520 can update the physical objects database 530 the physical objects database is confirmed to be absent from the facility. The control engine 520 can instruct the portable electronic device 100 to display a virtual element like the one displayed on the planogram on the touch-sensitive display 110.

The portable electronic device 100 can augment the display of the physical scene on the touch-sensitive display 110, by overlaying the virtual element on the physical scene rendered on the touch-sensitive display 110. The virtual element can be overlaid in the designated location as displayed on the touch-sensitive display 110. The virtual element can be static or animated. The user can interact with the virtual element by tapping or touching the touch sensitive screen 110 at the location at which the virtual element is displayed to report the physical object is or is not absent from the designated location. For example, the user can tap and hold down the virtual element displayed on the touch-sensitive display 110 and swipe to the right to indicate the physical object is in fact absent; alternatively, the user can swipe to the left to indicate the physical object is present in the designated location. The portable electronic device 110 can transmit the interaction to the computing system 500. The computing system 500 can determine the user has correctly indicated an absent physical object or a physical object which is present, based on the interaction with the virtual element. The computing system 500 can generate a reliability score based on the determination that the user has correctly indicated the status of the physical object. The relatability score can indicate a confidence level in a user's ability to report absent physical objects. The control engine 520 can instruct the portable electronic device 100 to display the reliability score of the user on the touch-sensitive display 110.

For example, the user can navigate to a virtual element displayed on the planogram and discover the physical object is present in the designated location. The control engine 520 can determine the physical object is present based on the image transmitted by the portable electronic device 100. In the event, the user attempts to report the physical object as absent by interacting with the virtual element, the control engine 520 can reduce the reliability score of the user. The control engine 520 can store the reliability score in the accounts database 545 using the identifier of the portable electronic device 100.

Once the user has indicated the presence or absence of the physical object, the control engine 520 can instruct the portable electronic device 100 to display instructions to navigate to the next virtual element. In some embodiments, the control engine 520 can provide navigation guidance to the user to the next virtual element. For example, the control engine 520 can instruct the portable electronic device 100 to display arrows guiding the user to the next virtual element (e.g. as shown in FIG. 3).

As a non-limiting example, the augmented display system 550 can be implemented in a retail store to confirm out-of-stock products. The facility can be embodied as a retail store and the physical objects can be embodied as products for sale at the retail store. Accordingly, the absent physical objects can be embodied as out-of-stock items. The users can be customers, incentivized to report confirmations of out-of-stock items. The control engine 540 can reward the customer for high reliability scores. For example, the control engine 540 can query the accounts database 545 and determine a purchase history/profile of the user. The control engine 540 can provide coupons, sale notifications and other incentives for reporting out-of-stock items in an accurate manner. The control engine 540 can instruct the portable electronic device 100 of the user to display the incentives on the touch-sensitive display 110 while the user is in the retail store.

In one embodiment, a user can operate the portable electronic device 100 in the facility. The portable electronic device 100 can execute the generation application 540. The user can navigate to the designated location of the particular set of physical objects in the facility. The generation application 540 control the operation of the image capturing device 108, to power on the image capturing device 108. In response to powering on, a lens and optical sensor included in the image capturing device 108 can become operational. The image capturing device 108 can be pointed at a physical scene in the facility, viewable to the lens and optical sensor, and the physical scene can displayed on the touch-sensitive display 110. The image capturing device 108 can zoom, pan, capture and store the physical scene. For example, the physical scene can be the shelving unit disposed in the facility. The user can point the image capturing device at the designated location of the particular set of physical objects. The designated location in the physical scene can be viewable on the touch-sensitive display 110.

In one embodiment, in response to pointing the image capturing device 108 at a physical scene (e.g. the shelving unit) for more than a specified amount of time, the image capturing device 108 can detect attributes associated with the physical scene. The user operating the portable electronic device 100 can tap or touch a physical item displayed on the touch-sensitive display 108. The physical item can be an area of the shelving unit in which the particular set of physical objects is designated to be disposed. The portable electronic device 100 can augment the display of the physical scene on the touch-sensitive display 110, by overlaying the virtual element on the physical scene rendered on the touch-sensitive display 110. The virtual element can be overlaid in the designated location of the particular set of physical objects. As an example, the virtual element can be overlaid on the back shelf of the shelving unit in the physical scene, on the touch-sensitive display 110. The virtual element can be graphical representations of cards disposed in an envelope. The cards can include string of alphanumeric text and/or a machine readable element encoded with identifier associated with particular set of physical objects.

The user can interact with the graphical representation of the envelope and cards by tapping or touching the touch sensitive screen 110 on or about the location at which the graphical representation of the envelope and cards are rendered. In response to the user tapping or touching the touch sensitive screen 110 on or about the location at which the graphical representation of the envelope and cards are rendered, the generation application 540 can animate a card being removed from the envelope and placed adjacent to the envelope. The user can tap or touch the touch sensitive screen at the location at which the graphical representation of the card disposed adjacent to the graphical representation of the envelope. In response to the user tapping or touching the touch sensitive screen 110 at the location at which the graphical representation of the card disposed adjacent to the graphical representation of the envelope is disposed, the generation application 540 can extract the machine-readable element and/or string of alphanumeric characters associated with the particular set of physical objects. The generation application 540 can also decode the identifier from the machine-readable element. The graphical representation of the card can be deleted from the screen, in response to extracting the machine-readable element and/or string of alphanumeric characters associated with the particular set of physical objects. Additionally, the portable electronic device 100 can be prevented from removing another graphical representation of a card from the graphical representation of the envelope for the particular set of physical objects.

The generation application 540 can transmit the identifier and/or string of alphanumeric characters to the computing system 500. In one embodiment, in response to transmitting the identifier and/or string of alphanumeric characters to the computing system 500, the image capturing device of the portable electronic device 100 can capture an image of the physical scene and the portable electronic device 100 can transmit the image to the computing system 500. Alternatively, or in addition, the portable electronic device 100 can transmit the detected attributes of the physical object or space, to the computing system 500. The attributes can include shape, size, and dimensions associated with the area of the designated location of the physical object. The control engine 520 can identify the particular set of physical objects based on the identifier and/or string of alphanumeric characters associated with the particular set of physical objects. The control engine 520 can conduct image analysis on the received image of the physical scene including the area of the designated location of the particular set of physical objects. The control engine 520 can also determine the location of the portable electronic device 100 by accessing the location services module of the portable electronic device 100. The control engine 520 can confirm the quantity of the particular set of physical objects is below a specified threshold at the designated location based on determining the vacant space in the area of the designated location of the particular set of physical objects using the image analysis and by matching the location of the portable electronic device with the designated location of the absent physical object. The control engine 520 can transmit/trigger an alert based on confirming the quantity of particular set of physical objects is below a threshold amount. Alternatively, the control engine 520 can determine the quantity of particular set of physical objects is below a threshold amount, is present at the designated location based on the image analysis. In some embodiments, the control engine 520 can identify the physical object based on received attributes associated with the physical object and/or space in which the physical object is designated to be disposed. The control engine 520 can update the physical objects database 530 the quantity of particular set of physical objects is confirmed to be below a threshold amount in the facility. Alternatively, or in addition to, the control engine 520 can use the identifier and/or string of alphanumeric characters to query the physical objects database, to retrieve the quantity of physical objects disposed in the facility. The control engine 520 can confirm the quantity of the set of physical objects is below a specified threshold amount.

The computing system 500 can determine the user has correctly reported the particular set of physical objects for which the quantity of particular set of physical objects is below a threshold amount. The computing system 500 can generate a reliability score based on the determination that the user has correctly indicated the status of the particular set of physical objects. The relatability score can indicate a confidence level in a user's ability to report sets of physical objects with quantities below a threshold amount. The control engine 520 can instruct the portable electronic device 100 to display the reliability score of the user on the touch-sensitive display 110.

In one embodiment, sensors 400 can be disposed on the shelving units in the facility. Physical objects can be disposed on the sensors 400. The sensors 400 can detect information associated with the physical objects, encode the information into electrical signals, and transmit the electrical signals to the computing system 500. The information can include weight of the physical objects. The computing system 500 can receive electronic signals from the sensors 400. The control engine 520 can decode the electrical signals and extract the information associated with the physical objects, including the weight. The control engine 520 can query the physical objects database to retrieve information associated with the physical objects. The control engine 520 can determine the quantity of physical objects disposed at the facility based on the weight extracted from the electronic signals and the information retrieved from the physical objects database 535. The control engine 520 can determine a quantity for a set of particular physical objects is below a threshold amount.

In one embodiment, the image capturing device 108 of the portable electronic device 100 can capture an image of the graphical representation of the card disposed adjacent to the graphical representation of the envelope. The user can navigate to a POS terminal 250 in the facility and use the optical scanner 260 to scan the machine-readable element on the image of the card. The POS terminal 250 can decode the identifier from the machine-readable element and transmit the identifier to the computing system 500.

As a non-limiting example, the augmented display system 550 can be implemented in a retail store to confirm low-in-stock/out-of-stock products. The facility can be embodied as a retail store and the physical objects can be embodied as products for sale at the retail store. The users can be customers, incentivized to report confirmations of low-in-stock/out-of-stock products. The control engine 540 can reward the customer for high reliability scores.

For example, the control engine 540 can query the accounts database 545 and determine a purchase history/profile of the user. The control engine 540 can provide coupons, sale notifications and other incentives for reporting low-in-stock/out-of-stock products in an accurate manner. The control engine 540 can instruct the portable electronic device 100 of the user to display the incentives on the touch-sensitive display 110 while the user is in the retail store.

Figure 6:
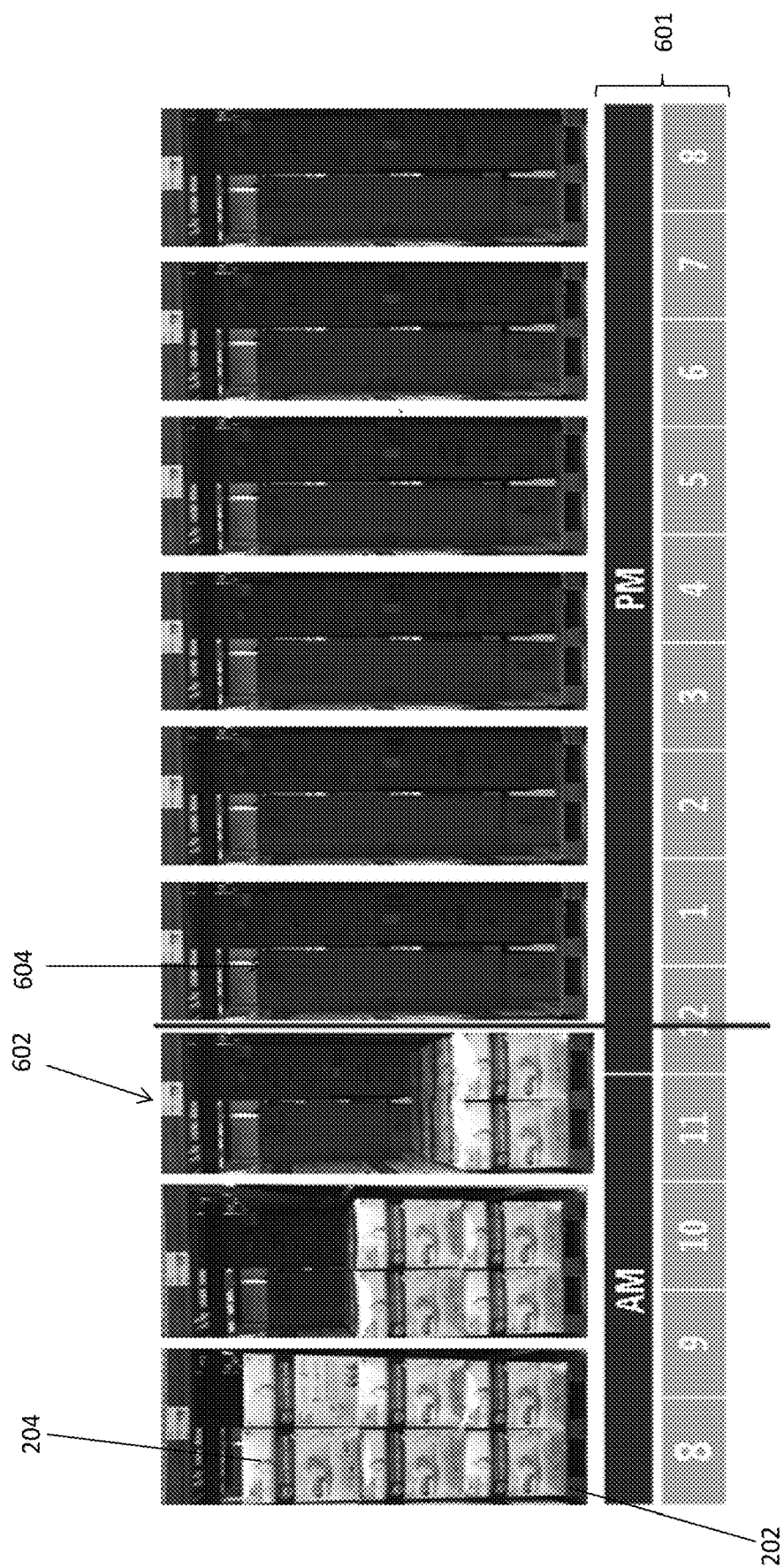
FIG. 6 illustrates an exemplary shelving unit storing physical objects as a function of time in accordance with an exemplary embodiment.

As an example, with reference to FIG. 6, items (i.e., physical objects 204) for sale can be disposed on shelving units 202. The time chart 601 illustrates the time of day. As illustrated by the time chart 601, at 11 AM and position 602, the items can be running low in stock, and after 12 PM the items can be out of stock. The customers may not report the low-in-stock/out-of-stock status of the items. This may cause a delay in re-stocking the shelving units 202, a loss of sale, and errors in forecasting sales.

In this regard, with reference to FIGS. 5 and 6, the augmented display system 550 as described herein, can overlay graphical representation of an envelope and cards inside the envelope on a physical scene viewable by the image capturing device 108 of the portable electronic device, on the touch-sensitive display 110. The graphical representations of the envelope and cards can be rendered on the back face 604 of the shelving units 202. The control engine 520 can insert the graphical representations of the envelope and cards at the position 602 when the items are running low-in-stock. The interaction of the user with the graphical representation of the envelope and cards can indicate a loss of sale to the retail store. Based on receiving an indication of loss of sale, the control engine 520 can update the physical objects database 535 which can include a demand history of each of the physical objects. The demand history of the physical objects can be used to optimize a forecasting algorithm to generate a better forecast so that the fulfillment process will correctly restock the shelving units 202 with the items in the future. In response to the customer reporting the low-in-stock/out-of-stock items better forecasting of inventory.

Figure 7:
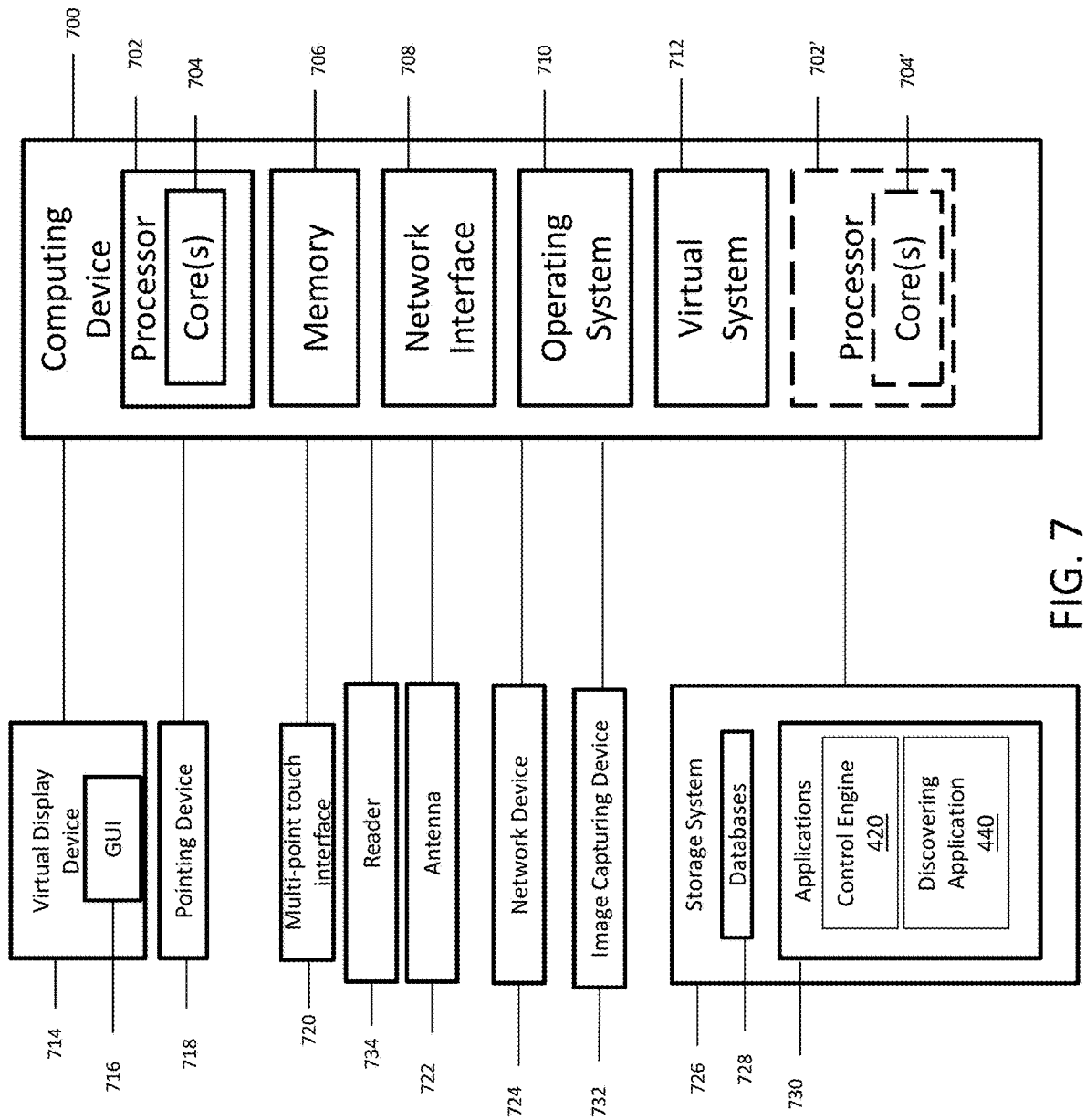
FIG. 7 illustrates a block diagram an exemplary computing device in accordance with an exemplary embodiment.

FIG. 7 is a block diagram of an exemplary computing device suitable for implementing embodiments of the augmented display system. The computing device may be, but is not limited to, a smartphone, laptop, tablet, desktop computer, server or network appliance. The computing device 700 can be embodied as the computing system and/or portable electronic device. The computing device 700 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 706 included in the computing device 700 may store computer-readable and computer-executable instructions or software (e.g., applications 730 such as the control engine 520 and the generation application 540) for implementing exemplary operations of the computing device 700. The computing device 700 also includes configurable and/or programmable processor 702 and associated core(s) 704, and optionally, one or more additional configurable and/or programmable processor(s) 702' and associated core(s) 704' (for example, in the case of computer systems having multiple processors/cores), for executing computer-readable and computer-executable instructions or software stored in the memory 706 and other programs for implementing exemplary embodiments of the present disclosure. Processor 702 and processor(s) 702' may each be a single core processor or multiple core (704 and 704') processor. Either or both of processor 702 and processor(s) 702' may be configured to execute one or more of the instructions described in connection with computing device 700.

Virtualization may be employed in the computing device 700 so that infrastructure and resources in the computing device 700 may be shared dynamically. A virtual machine 712 may be provided to handle a process running on multiple processors so that the process appears to be using only one computing resource rather than multiple computing resources. Multiple virtual machines may also be used with one processor.

Memory 706 may include a computer system memory or random access memory, such as DRAM, SRAM, EDO RAM, and the like. Memory 706 may include other types of memory as well, or combinations thereof. The computing device 700 can receive data from input/output devices such as, a reader 634 and an image capturing device 732.

A user may interact with the computing device 700 through a visual display device 714, such as a computer monitor, which may display one or more graphical user interfaces 716, multi touch interface 720 and a pointing device 718.

The computing device 700 may also include one or more storage devices 726, such as a hard-drive, CD-ROM, or other computer readable media, for storing data and computer-readable instructions and/or software that implement exemplary embodiments of the present disclosure (e.g., applications such as the control engine 520 and the generation application 540). For example, exemplary storage device 726 can include one or more databases 728 for storing information regarding the physical objects, facilities and accounts. The databases 728 may be updated manually or automatically at any suitable time to add, delete, and/or update one or more data items in the databases.

The computing device 700 can include a network interface 708 configured to interface via one or more network devices 724 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 722 to facilitate wireless communication (e.g., via the network interface) between the computing device 700 and a network and/or between the computing device 700 and other computing devices. The network interface 708 may include a built-in network adapter, network interface card, PCMCIA network card, card bus network adapter, wireless network adapter, USB network adapter, modem or any other device suitable for interfacing the computing device 700 to any type of network capable of communication and performing the operations described herein.

The computing device 700 may run any operating system 710, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 700 and performing the operations described herein. In exemplary embodiments, the operating system 710 may be run in native mode or emulated mode. In an exemplary embodiment, the operating system 710 may be run on one or more cloud machine instances.

Figure 8:
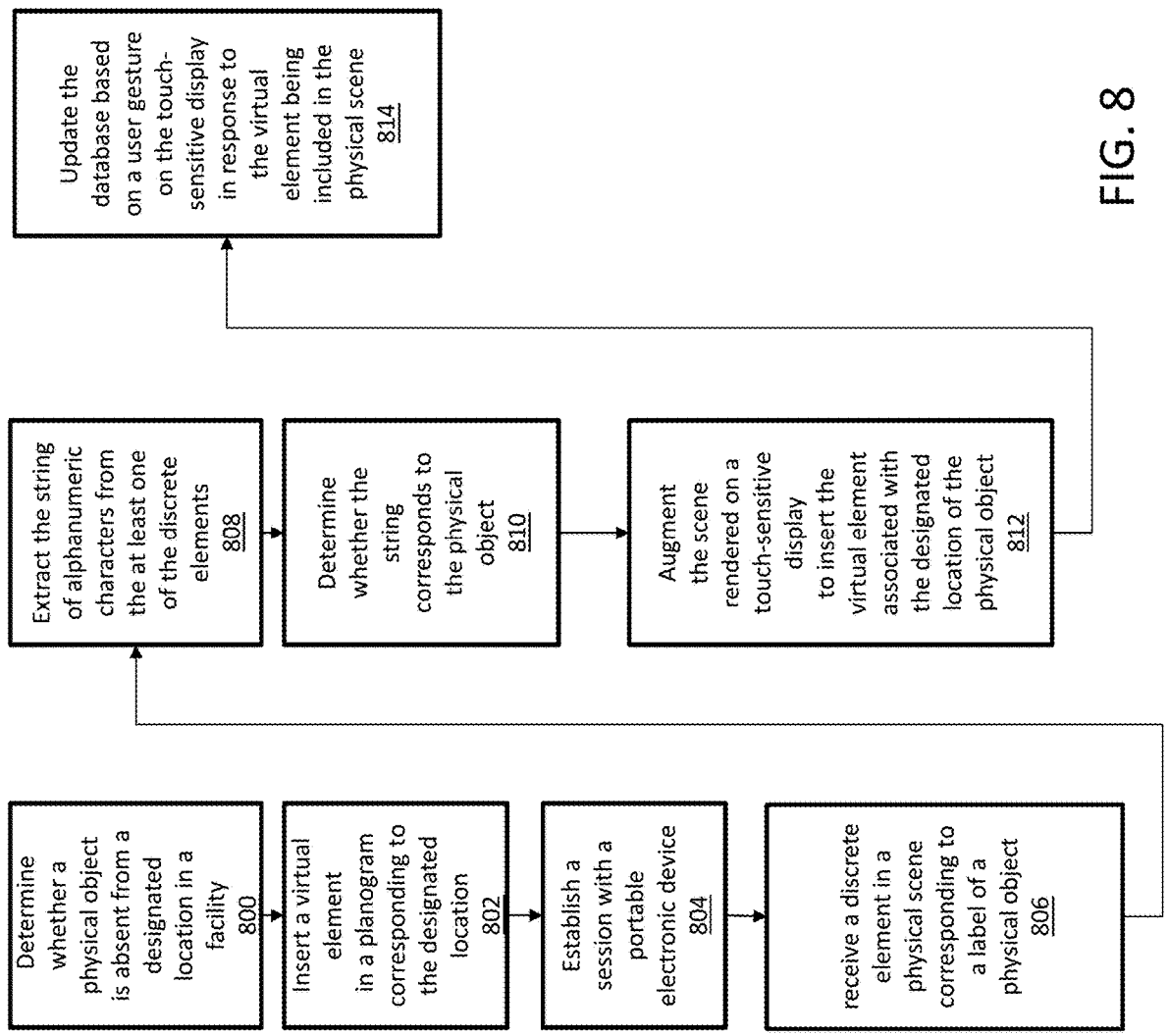
FIG. 8 is a flowchart illustrating a process implemented by an augmented touch-sensitive display system according to an exemplary embodiment.

FIG. 8 is a flowchart illustrating a process implemented by an augmented display system according to an exemplary embodiment. In operation 800, a computing system (e.g. computing system 500 as shown in FIG. 5) can determine whether a physical object (e.g. physical object 204 as shown in FIGS. 2A-2B) is absent from a designated location in a facility (e.g. facility 200 as shown in FIGS. 2A-3) in response to data retrieved from the database (e.g. physical objects database 530 as shown in FIG. 5). In operation 802, the computing system can insert a virtual element (e.g. virtual element 220 as shown in FIGS. 2B and 3) in a planogram (e.g. planogram 302 as shown in FIG. 3) corresponding to the designated location of the facility in response to determining that the retrieved data indicates that the physical object is absent. In operation 804, the computing system can establish a session with a portable electronic device (e.g. portable electronic device 100 as shown in FIGS. 1, 2B, 3, 5) in response to a request received from an application (e.g. generation application 540 as shown in FIG. 5) executing on the portable electronic and a determination that the portable electronic device is in the facility.

In operation 806, the computing system can receive a discrete element in a physical scene (e.g. physical scene 218 as shown in FIG. 2B) acquired by the image capturing device of the portable electronic device The physical scene can correspond to a field of view of the image capturing device (e.g., image capturing device 108 as shown in FIGS. 1 and 2B) and can be parsed to extract the discrete elements from the scene. The discrete virtual elements can correspond to a label (e.g. label 206 as shown in FIGS. 2A-B). In operation 808, the computing system can extract a string of alphanumeric characters from the label corresponding to the discrete element. In operation 810, the computing system can determine whether the string corresponds to the physical object. In operation 812, the computing system can augment via interaction with the application executing on the portable electronic device, the scene rendered on a touch-sensitive display (e.g. touch-sensitive display 110 as shown in FIGS. 1, 2B, 3 and 5) of the portable device to insert a virtual element associated with the designated location of the physical object in the planogram into the scene adjacent to the label. In operation 814, the computing system can update the database based on a user gesture on the touch-sensitive display in response to the virtual element being included in the physical scene.

Figure 9:
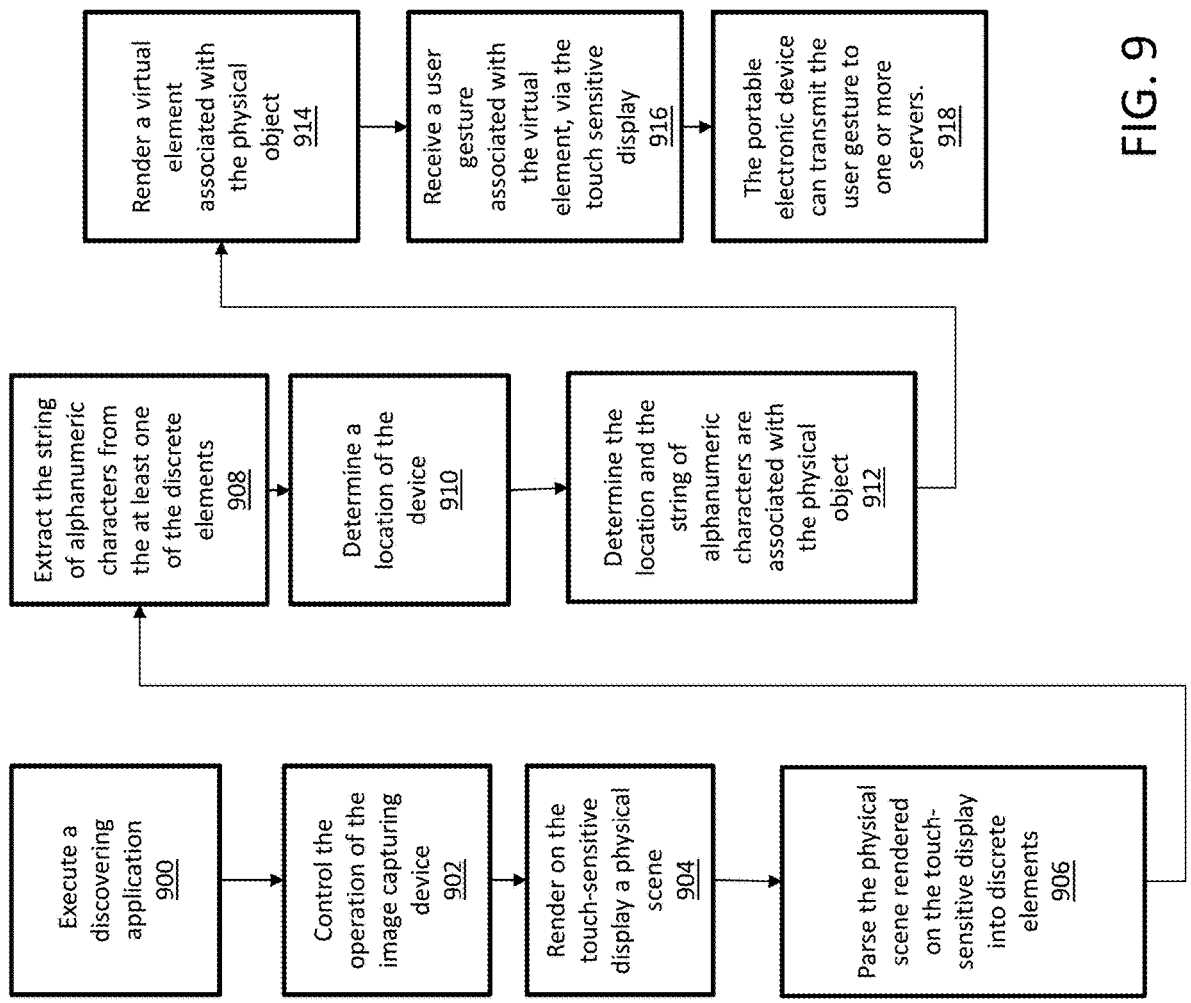
FIG. 9 is a flowchart illustrating a process implemented by an augmented touch-sensitive display system according to an exemplary embodiment.

FIG. 9 is a flowchart illustrating a process implemented by an augmented display system according to an exemplary embodiment. In operation 900, a portable electronic device (e.g. portable electronic device 100 as shown in FIGS. 1, 2B, 3, and 5) including a touch-sensitive display (e.g. touch-sensitive display 110 as shown in FIGS. 1, 2B, 3 and 5), an image capturing device (e.g. image capturing device 108 as shown in FIGS. 1, 2B, 3 and 4), a processor (e.g. processor 104 as shown in FIG. 1) and a memory (e.g. memory 106 as shown in FIG. 1) can execute a generation application (e.g. generation application 540 as shown in FIG. 5) using the processor. The portable electronic device can be in communication with a computing system (e.g. computing system 500 as shown in FIG. 5). In operation 902, the portable electronic device can control the operation of the image capturing device, in response to executing the application to contemporaneously and continuously image an area within a field of view of the image capturing device. In operation 904, the portable electronic device can render a physical scene (e.g. physical scene 218 as shown in FIG. 2B) within the field of view of the image capturing device on the touch-sensitive display. In operation 906, the portable electronic device can parse the physical scene rendered on the touch-sensitive display into discrete elements based on dimensions of items in the physical scene. The discrete elements can include at least a label (e.g. label 206 as shown in FIGS. 2A-B) including a string of alphanumeric characters (e.g. string of alphanumeric characters 208 as shown in FIGS. 2A-B) associated with a physical object (e.g. physical object 204 as shown in FIGS. 2A-B). In operation 908, the portable electronic device can extract the string of alphanumeric characters from the at least one of the discrete elements. In operation 910 the portable electronic device can determine a location of the device. In operation 912, the portable electronic device can determine the location and the string of alphanumeric characters are associated with the physical object, based on the location and string of alphanumeric characters. In operation 914, the portable electronic device can render a virtual element (e.g. virtual element 220 as shown in FIG. 2B) associated with the physical object, on the touch touch-sensitive display. In operation 916, the portable electronic device can receive a user gesture associated with the virtual element, via the touch sensitive display. In operation 918, the portable electronic device can transmit the user gesture to one or more servers.

Figure 10:
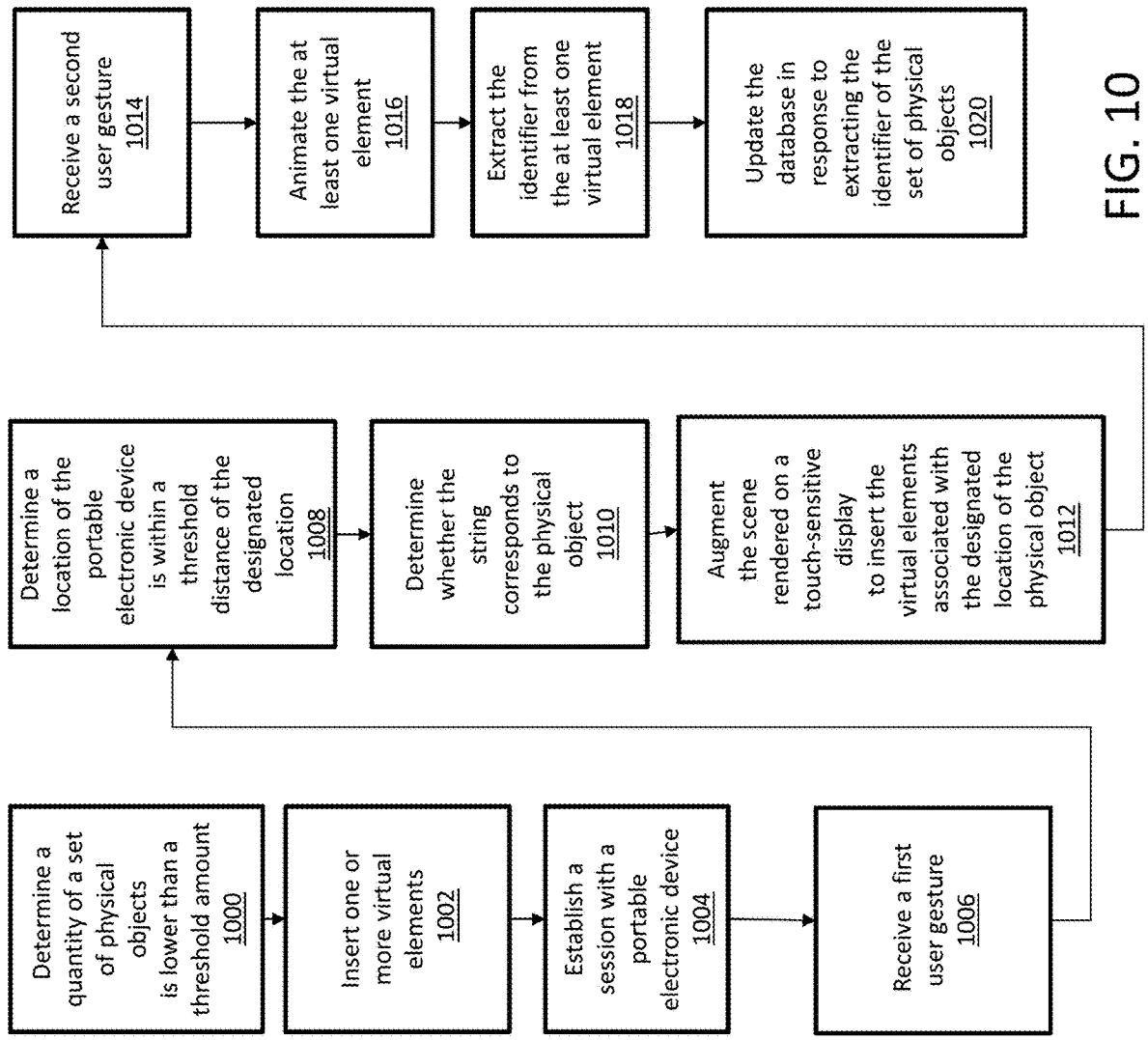
FIG. 10 is a flowchart illustrating a process implemented by an augmented touch-sensitive display system according to an exemplary embodiment.

FIG. 10 is a flowchart illustrating a process implemented by an augmented display system according to an exemplary embodiment. In operation 1000, one or more servers (e.g., computing system 500 as shown in FIG. 5) coupled to one or more data storage devices including at least one database and a planogram (e.g., planogram 302 as shown in FIG. 3) can determine a quantity of a set of physical objects (e.g., physical objects 204 as shown in FIGS. 2A-2C and 6) is lower than a threshold amount at a designated location in a facility in response to data retrieved from the database. In operation 1002, the one or more servers can insert one or more virtual elements (e.g., graphical representations of the cards and envelope 222, 224 as shown in FIG. 2C) in a planogram corresponding to the designated location of the facility in response to determining the quantity of the set of physical objects is lower than the threshold amount, at least one of the virtual elements including an identifier (e.g., identifier 226 as shown in FIG. 2C) associated with the set of physical objects. In operation 1004, the one or more servers can establish a session with a portable electronic device (e.g., portable electronic device 100 as shown in FIGS. 1, 2C, 3, and 5) in response to a request received from an application (e.g., generation application 540 as shown in FIG. 5) executing on the portable electronic and a determination that the portable electronic device is in the facility.

In operation 1006, the one or more servers can receive a first user gesture from the portable electronic device, associated a physical scene (e.g., physical scene 220 as shown in FIGS. 2C and 3) corresponding to a field of view of an image capturing device (e.g., image capturing device 110 as shown in FIGS. 1, 2C, 3 and 5) of the portable electronic device. As an example, the user can touch or tap the multi-touch sensitive display of the portable electronic device. In operation 1008, in response to receiving the first user gesture from the portable electronic device, the one or more servers can determine a location of the portable electronic device is within a threshold distance of the designated location of a set of physical objects. In operation 1010, the one or more servers interacting with the application executing on the portable electronic device, can augment the physical scene rendered on a touch-sensitive display (e.g., touch-sensitive display 110 as shown in FIGS. 1, 2C, 3 and 4) of the portable device to insert the one or more virtual elements associated with the designated location of the physical object in the planogram into the scene. As an example, the one or more servers can insert a graphical representation of an envelope and cards disposed inside the envelope. In operation 1012, the one or more servers can receive a second user gesture associated with interaction with the one or more virtual elements. As an example, the user can touch or tap a location of the multi-touch sensitive display of the portable electronic device corresponding with the location of the graphical representation of the envelope rendered on the multi-touch sensitive display, in the physical scene. In operation 1014 in response to receiving the second user gesture, one or more servers can animate the at least one virtual element of the one or more virtual elements including the identifier of the set of physical objects. As an example, a graphical representation of a card including an identifier of the physical objects can be animated to being removed from the envelope and changing its orientation to be perpendicularly aligned adjacent to the envelope. In operation 1016 the one or more servers can receive a third user gesture from the portable electronic device associated with the identifier of the set of physical objects. As an example, the user can touch or tap a location of the multi-touch sensitive display of the portable electronic device corresponding with the location of the graphical representation of the graphical representation of the card perpendicularly aligned with the graphical representation of the envelope rendered on the multi-touch sensitive display. In operation 1018, the one or more servers can extract the identifier from the at least one virtual element (i.e., the card) of the one or more virtual elements in response to receiving the third gesture. In operation 1020, the one or more servers can update the database in response to extracting the identifier of the set of physical objects.

Figure 11:
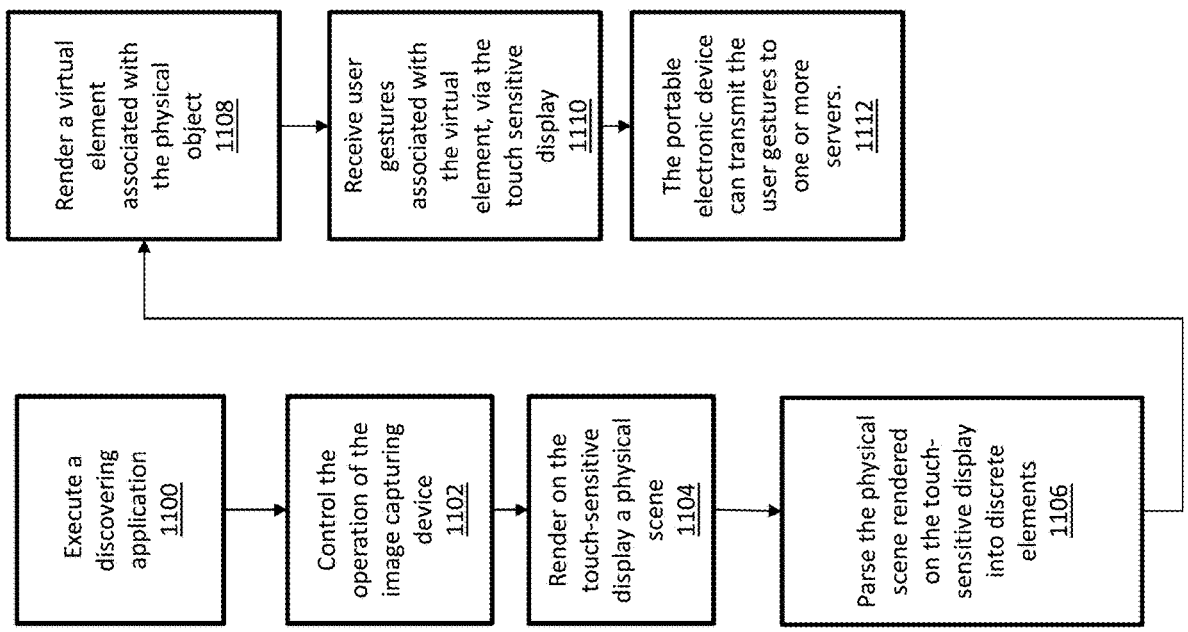
FIG. 11 is a flowchart illustrating a process implemented by an augmented touch-sensitive display system according to an exemplary embodiment.

FIG. 11 is a flowchart illustrating a process implemented by an augmented display system according to an exemplary embodiment. In operation 1100, a portable electronic device (e.g., portable electronic device 100 as shown in FIGS. 1, 2C, 3, and 5) including a touch-sensitive display (e.g., touch-sensitive display 110 as shown in FIGS. 1, 2C, 3 and 5), an image capturing device (e.g., image capturing device 108 as shown in FIGS. 1, 2C, 3 and 5), a processor (e.g., processor 104 as shown in FIG. 1) and a memory (e.g. memory 106 as shown in FIG. 1) can execute a generation application (e.g., generation application 540 as shown in FIG. 5) using the processor. The portable electronic device can be in communication with one or more servers (e.g., computing system 500 as shown in FIG. 5). In operation 1102, the portable electronic device can control the operation of the image capturing device, in response to executing the application to contemporaneously and continuously image an area within a field of view of the image capturing device. In operation 1104, the portable electronic device can render a physical scene (e.g., physical scene 220 as shown in FIG. 2C) within the field of view of the image capturing device on the touch-sensitive display. In operation 1106, the portable electronic device can parse the physical scene rendered on the touch-sensitive display into discrete elements based on dimensions of items in the physical scene. The discrete elements can include physical objects (e.g., physical objects 202 as shown in FIGS. 2A-2C and 6) disposed on shelving units (e.g., shelving units 202 as shown in FIGS. 2A-2C and 6). In operation 1108, the portable electronic device can render one or more virtual elements associated with the set of physical objects on the touch-sensitive display. In operation 1110, the portable electronic device can receive a first, second and third user gesture associated with the one or more virtual elements, via the touch sensitive display. In operation 1112, the portable electronic device can transmit the first, second and third user gestures to the one or more servers.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

One or more of the exemplary embodiments, include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI is a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. An augmented display system, the system comprising:
one or more data storage devices storing at least one database and a planogram;
one or more servers coupled to the one or more data storage devices, configured to:
determine a physical object is absent from a designated location in a facility in response to data retrieved from the database;
inserting a virtual element in a planogram corresponding to the designated location of the facility in response to determining the physical object is absent;
establishing a session with a portable electronic device in response to a request received from an application executing on the portable electronic and a determination that the portable electronic device is in the facility;
receive a discrete element in a physical scene from the portable electronic device, the physical scene corresponding to a field of view of an image capturing device of the portable electronic device and being parsed to extract the discrete virtual element from the scene, the discrete virtual element corresponding to a label;
extract the string of alphanumeric characters from the discrete element;
determine whether the string corresponds to the physical object;
augment, via interaction with the application executing on the portable electronic device, the scene rendered on a touch-sensitive display of the portable device to insert the virtual element associated with the designated location of the physical object in the planogram into the scene adjacent to the label; and
update the database based on a user gesture on the touch-sensitive display in response to the virtual element being included in the physical scene.

2. The system of claim 1, wherein the portable electronic device is configured to:
execute an application stored in memory via the processor;
control the operation of the image capturing device, in response to executing the application to contemporaneously and continuously image an area within a field of view of the image capturing device;
render on the touch-sensitive display the physical scene within the field of view of the image capturing device;
parse the physical scene rendered on the touch-sensitive display into the discrete elements based on dimensions of items in the physical scene;
render the virtual element associated with the physical objects on the touch touch-sensitive display;
receive the user gesture associated with the virtual element, via the touch sensitive display; and
transmit the user gesture to the one or more servers.

3. The system of claim 1, wherein the one or more servers are configured to: determine the physical object is absent from the designated location based on a quantity of each set of like physical object stored in the database, being less than a specified amount.

4. The system of claim 1, wherein the application is associated with a user of the portable electronic device.

5. The system of claim 4, wherein the one or more servers are configured to:
   trigger an alert in response to updating the database based on a user gesture on the touch-sensitive display in response to the virtual element being included in the physical scene.

6. The system of claim 5, wherein the one or more servers are configured to:
   update the database to indicate the user of the portable device transmitted the user gesture confirming the physical objects are absent from the designated location;
   generate a score associated with the user of the portable electronic device; and
   transmit the score to the portable electronic device.

7. The system of claim 6, wherein the portable electronic device is configured to:
   render instructions on the touch-sensitive display instructing the user of the portable electronic device to navigate to a location in the facility associated with additional physical objects.

8. The system of claim 1, wherein the virtual element is an image including a selectable link.

9. The system of claim 8, wherein the selectable link includes information associated the physical object.

10. The system of claim 1, wherein the one or more servers are configured to:
    receive a captured image of the physical scene in response to the user gesture on the touch-sensitive screen.

11. An augmented display method, the method comprising:
    determining, via one or more servers, whether a physical object is absent from a designated location in a facility in response to data retrieved from the database;
    inserting, via the one or more servers, a virtual element in a planogram corresponding to the designated location of the facility in response to determining the physical object is absent;
    establishing, via the one or more servers, a session with a portable electronic device in response to a request received from an application executing on the portable electronic and a determination that the portable electronic device is in the facility;
    receiving, via the one or more servers, a discrete element in a physical scene from the portable electronic device, the physical scene corresponding to a field of view of an image capturing device of the portable electronic device and being parsed to extract the discrete virtual element from the scene, the discrete virtual element corresponding to a label;
    extracting, via the one or more servers, the string of alphanumeric characters from the discrete element;
    determining, via the one or more servers, whether the string corresponds to the physical object;
    augmenting, via the one or more servers, via interaction with the application executing on the portable electronic device, the scene rendered on a touch-sensitive display of the portable device to insert the virtual element associated with the designated location of the physical object in the planogram into the scene adjacent to the label; and
    updating, via the one or more servers, the database based on a user gesture on the touch-sensitive display in response to the virtual element being included in the physical scene.

12. The method of claim 11, further comprising:
    executing, via the portable electronic device, an application stored in memory via the processor;
    controlling, via the portable electronic device, the operation of the image capturing device, in response to executing the application to contemporaneously and continuously image an area within a field of view of the image capturing device;
    rendering, via the portable electronic device, on the touch-sensitive display the physical scene within the field of view of the image capturing device;
    parsing, via the portable electronic device, the physical scene rendered on the touch-sensitive display into the discrete elements based on dimensions of items in the physical scene;
    rendering, via the portable electronic device, the virtual element associated with the physical objects on the touch touch-sensitive display;
    receiving, via the portable electronic device, the user gesture associated with the virtual element, via the touch sensitive display; and
    transmitting, via the portable electronic device, the user gestures to the one or more servers.

13. The method of claim 11, further comprising determining, via the one or more servers, the physical object is absent from the designated location based on a quantity of each set of like physical object stored in the database, being less than a specified amount.

14. The method of claim 11, wherein the application is associated with a user of the portable electronic device.

15. The method of claim 14, further comprising:
    triggering, via the one or more servers, an alert in response to updating the database based on a user gesture on the touch-sensitive display in response to the virtual element being included in the physical scene.

16. The method of claim 15, further comprising:
    updating, via the one or more servers, the database to indicate the user of the portable device transmitted the user gesture confirming the physical objects are absent from the designated location;
    generating, via the one or more servers, a score associated with the user of the portable electronic device; and
    transmitting, via the one or more servers, the score to the portable electronic device.

17. The method of claim 16, further comprising:
    rendering, via the portable electronic devices, instructions on the touch-sensitive display instructing the user of the portable electronic device to navigate to a location in the facility associated with additional physical objects.

18. The method of claim 11, wherein the virtual element is an image including a selectable link.

19. The method of claim 11, wherein the selectable link includes information associated the physical object.

20. The method of claim 11, further comprising:
    receiving, via the one or more servers, a captured image of the physical scene in response to the user gesture on the touch-sensitive screen.

21. An augmented display system, the system comprising:
    a portable electronic device including a touch-sensitive display, an image capturing device, and a processor and memory, and operatively coupled to one or more servers, the device configured to:
    execute an application stored in memory via the processor;
    control the operation of the image capturing device, in response to executing the application to contemporaneously and continuously image an area within a field of view of the image capturing device;

render on the touch-sensitive display a physical scene within the field of view of the image capturing device;
parse the physical scene rendered on the touch-sensitive display into discrete elements based on dimensions of items in the physical scene, at least one of the discrete elements including at least a label including a string of alphanumeric characters associated with a physical object;
extract the string of alphanumeric characters from the at least one of the discrete elements;
determine a location of the device;
determine the location and the string of alphanumeric characters are associated with the physical object, based on the location and string of alphanumeric characters;
render a virtual element associated with the physical object, on the touch touch-sensitive display;
receive a user gesture associated with the virtual element, via the touch sensitive display; and
transmit the user gesture to one or more servers.

22. An augmented display method, the method comprising:
determining, via one or more servers, whether a physical object is absent from a designated location in a facility in response to data retrieved from the database;
inserting, via the one or more servers, a virtual element in a planogram corresponding to the designated location of the facility in response to determining the physical object is absent;
establishing, via the one or more servers, a session with a portable electronic device in response to a request received from an application executing on the portable electronic and a determination that the portable electronic device is in the facility;
receiving, via the one or more servers, a discrete element in a physical scene from the portable electronic device, the physical scene corresponding to a field of view of an image capturing device of the portable electronic device and being parsed to extract the discrete virtual element from the scene, the discrete virtual element corresponding to a label;
extracting, via the one or more servers, the string of alphanumeric characters from the discrete element;
determining, via the one or more servers, whether the string corresponds to the physical object;
augmenting, via the one or more servers, via interaction with the application executing on the portable electronic device, the scene rendered on a touch-sensitive display of the portable device to insert the virtual element associated with the designated location of the physical object in the planogram into the scene adjacent to the label; and
updating, via the one or more servers, the database based on a user gesture on the touch-sensitive display in response to the virtual element being included in the physical scene.

23. The method of claim 22, further comprising:
executing, via the portable electronic device, an application stored in memory via the processor;
controlling, via the portable electronic device, the operation of the image capturing device, in response to executing the application to contemporaneously and continuously image an area within a field of view of the image capturing device;
rendering, via the portable electronic device, on the touch-sensitive display the physical scene within the field of view of the image capturing device;
parsing, via the portable electronic device, the physical scene rendered on the touch-sensitive display into the discrete elements based on dimensions of items in the physical scene;
rendering, via the portable electronic device, the virtual element associated with the physical objects on the touch touch-sensitive display;
receiving, via the portable electronic device, the user gesture associated with the virtual element, via the touch sensitive display; and
transmitting, via the portable electronic device, the user gestures to the one or more servers.

24. The method of claim 22, further comprising determining, via the one or more servers, the physical object is absent from the designated location based on a quantity of each set of like physical object stored in the database, being less than a specified amount.

25. The method of claim 22, wherein the application is associated with a user of the portable electronic device.

26. The method of claim 25, further comprising:
triggering, via the one or more servers, an alert in response to updating the database based on a user gesture on the touch-sensitive display in response to the virtual element being included in the physical scene.

27. The method of claim 26, further comprising:
updating, via the one or more servers, the database to indicate the user of the portable device transmitted the user gesture confirming the physical objects are absent from the designated location;
generating, via the one or more servers, a score associated with the user of the portable electronic device; and
transmitting, via the one or more servers, the score to the portable electronic device.

28. The method of claim 27, further comprising:
rendering, via the portable electronic devices, instructions on the touch-sensitive display instructing the user of the portable electronic device to navigate to a location in the facility associated with additional physical objects.

29. The method of claim 22, wherein the virtual element is an image including a selectable link.

30. The method of claim 22, wherein the selectable link includes information associated the physical object.

31. The method of claim 22, further comprising:
receiving, via the one or more servers, a captured image of the physical scene in response to the user gesture on the touch-sensitive screen.

* * * * *